(12) United States Patent
Todd et al.

(10) Patent No.: US 9,447,832 B2
(45) Date of Patent: Sep. 20, 2016

(54) VEHICLE BRAKE MONITORING SYSTEM AND METHOD

(75) Inventors: Jamie Bishop Todd, Guelph (CA); Sam Jamison Todd, Guelph (CA); Jerid Allan Leclair, Guelph (CA)

(73) Assignee: NBS Innovative Solutions, Ltd., Guelph, Ontario (CA)

( * ) Notice: Subject to any disclaimer, the term of this patent is extended or adjusted under 35 U.S.C. 154(b) by 1404 days.

(21) Appl. No.: 13/003,460

(22) PCT Filed: Jul. 10, 2009

(86) PCT No.: PCT/CA2009/000961
§ 371 (c)(1),
(2), (4) Date: Jun. 14, 2011

(87) PCT Pub. No.: WO2010/003244
PCT Pub. Date: Jan. 14, 2010

(65) Prior Publication Data
US 2011/0241866 A1   Oct. 6, 2011

Related U.S. Application Data

(60) Provisional application No. 61/129,671, filed on Jul. 10, 2008.

(51) Int. Cl.
| | | |
|---|---|---|
| *B60Q 1/08* | (2006.01) |
| *F16D 66/02* | (2006.01) |
| *B60T 17/08* | (2006.01) |
| *B60T 17/22* | (2006.01) |
| *F16D 65/22* | (2006.01) |
| *F16D 66/00* | (2006.01) |
| *F16D 125/30* | (2012.01) |
| *F16D 125/56* | (2012.01) |
| *F16D 125/64* | (2012.01) |

(52) U.S. Cl.
CPC ............. *F16D 66/02* (2013.01); *B60T 17/088* (2013.01); *B60T 17/22* (2013.01); *F16D 65/22* (2013.01); *F16D 2066/001* (2013.01); *F16D 2066/003* (2013.01); *F16D 2125/30* (2013.01); *F16D 2125/56* (2013.01); *F16D 2125/64* (2013.01)

(58) Field of Classification Search
CPC .......................... F16D 65/60; F16D 2066/003
USPC ........................... 340/453; 188/79.52, 1.11 L
See application file for complete search history.

(56) References Cited

U.S. PATENT DOCUMENTS

| | | | |
|---|---|---|---|
| 4,970,496 A | | 11/1990 | Kirkpatrick |
| 5,253,735 A | * | 10/1993 | Larson et al. ........... 188/1.11 L |
| 5,285,190 A | * | 2/1994 | Humphreys et al. ......... 340/453 |
| 5,339,069 A | | 8/1994 | Penner |
| 5,410,293 A | * | 4/1995 | Angerfors .................... 340/454 |
| 5,812,053 A | | 9/1998 | Kovack |

(Continued)

FOREIGN PATENT DOCUMENTS

GB           1387807 A        3/1975

*Primary Examiner* — Daryl Pope
(74) *Attorney, Agent, or Firm* — Renner, Kenner, Greive, Bobak, Taylor & Weber

(57) ABSTRACT

A vehicle brake monitoring system comprises at least one sensor for detecting relative rotational position of a brake camshaft during vehicle braking. The at least one sensor is unconnected to the camshaft for remotely detecting the position. Processing structure communicates with the at least one sensor, and processes the output of the at least one sensor to determine brake status.

40 Claims, 21 Drawing Sheets

(56) References Cited

U.S. PATENT DOCUMENTS

| | | | |
|---|---|---|---|
| 5,992,579 A * | 11/1999 | Kyrtsos | 188/79.52 |
| 6,105,730 A | 8/2000 | Ekeroth | |
| 6,144,125 A * | 11/2000 | Birkestrand | B62K 23/04 180/206.2 |
| 6,345,699 B1 * | 2/2002 | Runels | 188/1.11 L |
| 7,323,865 B2 * | 1/2008 | Teulings | F01L 1/34 324/174 |
| 2005/0057344 A1 * | 3/2005 | Davis et al. | 340/425.5 |
| 2005/0212357 A1 * | 9/2005 | Adams | 303/122.03 |
| 2006/0097569 A1 * | 5/2006 | Eberling et al. | 303/122.15 |

* cited by examiner

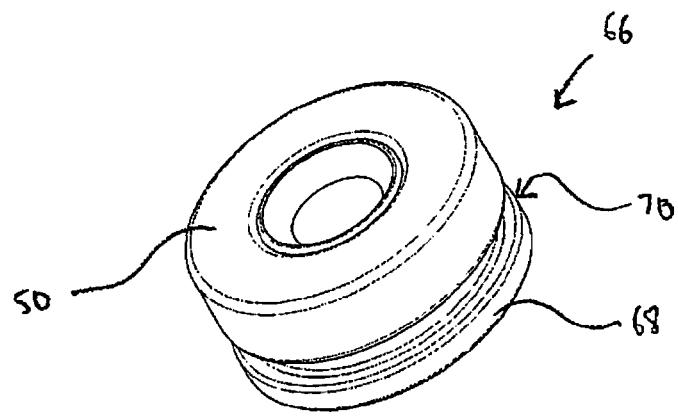
Figure 7a
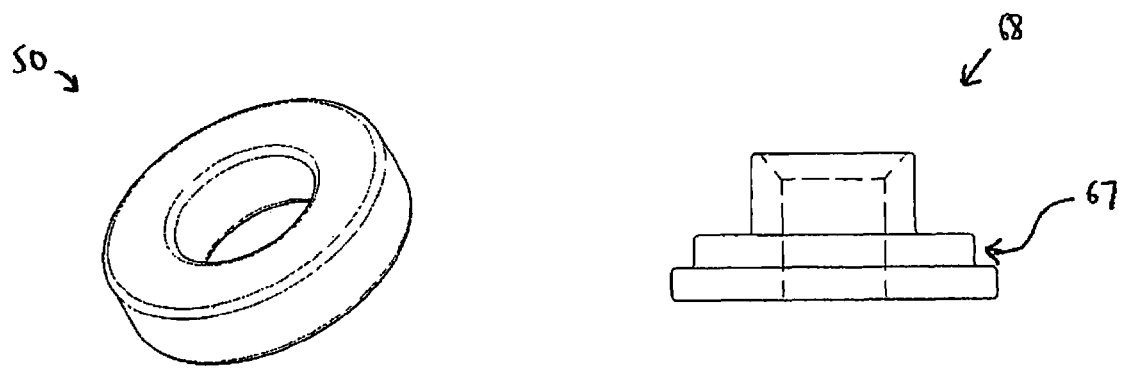
Figure 7b
Figure 7c

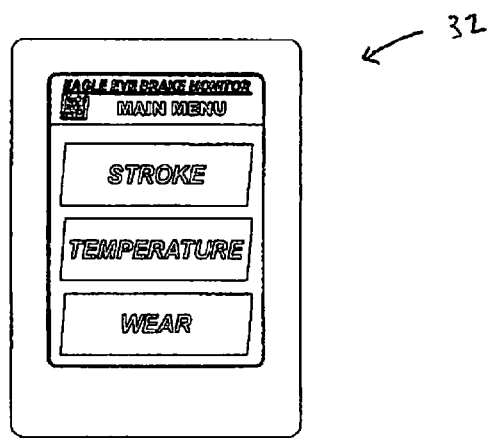
Figure 14a
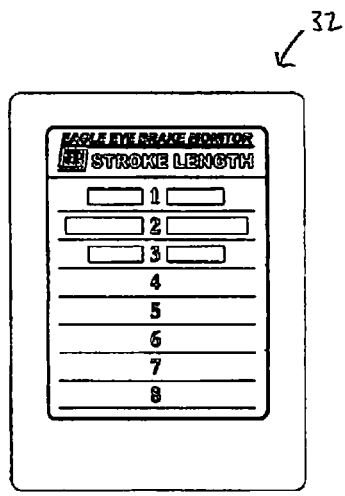 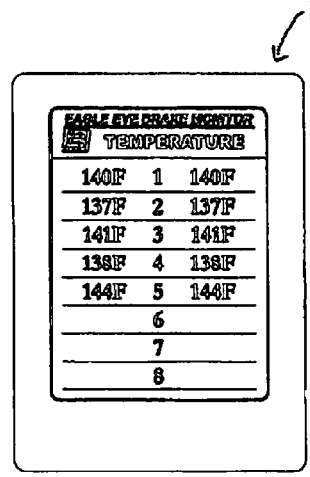 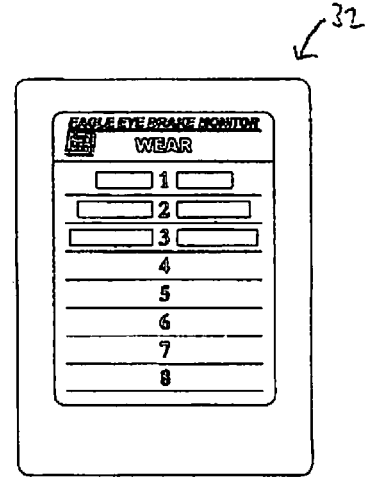
Figure 14b    Figure 14c    Figure 14d

VEHICLE BRAKE MONITORING SYSTEM AND METHOD

CROSS-REFERENCE TO RELATED APPLICATION

This application claims priority to U.S. Application Ser. No. 61/129,671, filed Jul. 10, 2008, entitled "Brake Monitoring System", the contents of which are incorporated herein in their entirety.

FIELD OF THE INVENTION

The present invention relates generally to vehicle diagnostics and particularly to a vehicle brake monitoring system and method for highway transport vehicles or the like.

BACKGROUND OF THE INVENTION

Brake-related problems account for over half of all violations that can bring a highway transport vehicle into an out-of-service state during roadside inspections. Brake problems are also a common cause of transport vehicle accidents, and have been cited as a factor in nearly 30% of all truck related accidents by the Commercial Vehicle Safety Association. For vehicle owners or operators of these vehicles, brake problems can therefore lead to costly downtime and, in the event of an accident, possible liability and insurance expenses.

In many cases, status of brake systems is assessed during roadside service inspections. These brake system inspections involve the measurement of the travel distance of the brake push rod to an accuracy level on the order of a fraction of an inch. However, it is estimated that 9% of vehicles that pass this test still have other brake issues that are difficult or impossible to detect without otherwise removing the wheel and/or dismantling the brake system and that warrant an out-of-service violation.

In-cab vehicle monitoring systems for highway transport vehicles are known. For example, U.S. Pat. No. 5,959,365 to Mantini et al. discloses an early warning device for tire rims and hub assemblies, comprising one or more individual axle spindle sensors, a programmable microprocessor for receiving and processing the sensor signals to detect an alarm condition, and alarm means to alert the driver of a problem with one or more of the wheels. The sensors are positioned in proximity to the axles and are capable of measuring heat, noise, vibration and/or knocking, which can be indicators of imminent detachment of the tire rim or the wheel hub assembly from the vehicle.

U.S. Patent Application Publication No. 20020019688 to Mantini discloses a brake monitoring system for trucks, tractors, trailers or buses using air brakes. An apparatus to monitor the braking system and the brake S-cam positioning comprises a positioning transducer which can convert the rotational movement of the brake S-cam camshaft to an electrical signal. This signal is used as the input to a microprocessor system for further analysis and comparison in determining the condition of the S-cam operations. The transducer signal not only provides the S-cam position, but the speed of rotation both in braking and release of the brakes. After analyzing the signal from the transducer with a microprocessor system some of the failure of the braking system can be detected. By comparing the signal from different wheels, the system can detect delays of applying brakes or delays of releasing brakes which also could be a failure condition of the air brake system.

While vehicle brake monitoring systems and methods are known, it is an object of the present invention to provide a novel vehicle brake monitoring system and method that overcomes deficiencies in such known systems and methods. Such deficiencies include, for example, the inability to distinguish slack from brake wear.

SUMMARY OF THE INVENTION

Accordingly, in one aspect there is provided a vehicle brake monitoring system comprising:

at least one sensor detecting relative rotational position of a brake camshaft during vehicle braking, the at least one sensor being unconnected to the camshaft for remotely detecting said position; and processing structure communicating with the sensor, the processing structure processing output of the at least one sensor to determine brake assembly status.

In another aspect, there is provided a vehicle brake monitoring apparatus comprising:

at least one sensor configured for detecting relative rotational position of a brake camshaft during vehicle braking, the at least one sensor being configured for being unconnected to the camshaft for remotely detecting said position.

In still another aspect, there is provided a method of monitoring a vehicle brake assembly, the method comprising the steps of:

remotely sensing at least one relative rotational position of a brake camshaft;

communicating the at least one relative rotational position to processing structure; and comparing the at least one relative rotational position to previous relative rotational position data to determine brake assembly status.

In another aspect, there is provided a system for determining status of a vehicle brake comprising:

a magnet mounted on a brake camshaft of the vehicle brake;

at least one sensor remote from the magnet and the camshaft and cooperating with the magnet to detect relative rotational position of the camshaft; and processing structure in communication with the at least one sensor for acquiring sensor data from the sensor and determining brake status based on the acquired sensor data.

In still another aspect, there is provided a system for determining vehicle brake assembly status comprising:

at least one magnetic sensor cooperating with a magnet mounted on a brake camshaft to produce sensor data related to the rotational position of the brake camshaft during braking; and processing structure receiving the sensor data and outputting a brake assembly status based on the sensor data.

The advantage of monitoring the camshaft rotation, instead of the push rod, is that information relating to both the camshaft rotation and the brake stroke is more accurate. Additionally, a measure of the brake wear is obtainable without removal of the wheels and the brake drum for inspection. Additionally, any irregularities in the operation of the slack adjuster do not influence the performance of the brake monitoring system, and moreover these irregularities can be detected and monitored by the system. A further advantage of the brake monitoring system is that it can be installed without interfering with the integrity of already-installed certified brake components, for example.

The brake monitoring system can be used to monitor the brake stroke length (i.e. based on the slack adjuster rotation and the camshaft rotation), the brake wear (i.e. based on the camshaft rotation), and the brake temperature simultaneously. Alternatively, by installing only certain sensors, the system can be operated in any of "stroke only", "wear only", or "temperature only" modes individually. The system is universal and can be used with any type of friction brake, including air-powered drum brakes or disc brakes, that are installed on any type of vehicle, such as automobiles, trucks, trains, buses, subway cars, heavy equipment, aircraft, or any other vehicle that utilizes friction brakes. The brake monitoring system can also be configured to be used in combination with other sensor systems of the vehicle, and to thereby be used as a universal monitoring system for a variety of sensor data, for example trailer door open/closed status, refrigerator operational status, cargo temperature, etc. A record of dates and times of coded trailer connections and drop offs can also be recorded and saved to a memory card to aid companies in fleet management. The system allows optimized maintenance scheduling to reduce overall operational expenses, and may decrease the risk of costly and possibly catastrophic failure of vehicle's brake system.

BRIEF DESCRIPTION OF THE DRAWINGS

Embodiments will now be described more fully with reference to the accompanying drawings in which:

FIG. 2b is an exploded front perspective view of a portion of the prior art brake assembly of FIG. 2a;

FIGS. 7a, 7b, and 7c are a perspective view of the sensor magnet assembly, a perspective view of a sensor magnet, and a side elevation view of a sensor magnet mount, respectively, for use with the brake monitoring apparatus of FIGS. 3a to 3c;

FIGS. 14a, 14b, 14c, and 14d are front views of the "menu", "stroke", "temperature", and "wear" screens, respectively, of the display module of FIG. 13a;

DETAILED DESCRIPTION OF THE EMBODIMENTS

The brake monitoring system described herein makes use of at least one sensor for detecting relative rotational movement the brake camshaft during brake operation. The system further comprises processing structure that processes output of the at least one sensor to determine brake assembly status.

In embodiments described herein, the brake monitoring system comprises one rotary sensor mounted to the slack adjuster for detecting movement of the slack adjuster relative to the brake camshaft during brake operation, and another rotary sensor fixedly mounted relative to the camshaft for detecting the relative rotational movement of the brake camshaft during brake operation.

One or more temperature sensors can also be placed in proximity to the brake assembly to acquire brake temperature data. When used in combination with brake camshaft data, the brake temperature data can provide indication of additional problems that would otherwise be undetectable by monitoring brake stroke alone.

The brake camshaft, slack adjuster, and temperature sensors are together in communication with a module positioned on a vehicle axle. The axle modules are hard wired or are wirelessly networked and are in communication with the processing structure. The processing structure compares brake camshaft data and slack adjuster data to previous camshaft data stored in memory to calculate values of both the stroke length and the brake wear, and displays these values to the driver together with the temperature data in real-time. The processing structure drives a touch screen to provide the driver with user-friendly interactive access to the data.

The brake monitoring system is hereafter described with reference to FIGS. 1 to 19.

Figure 1:
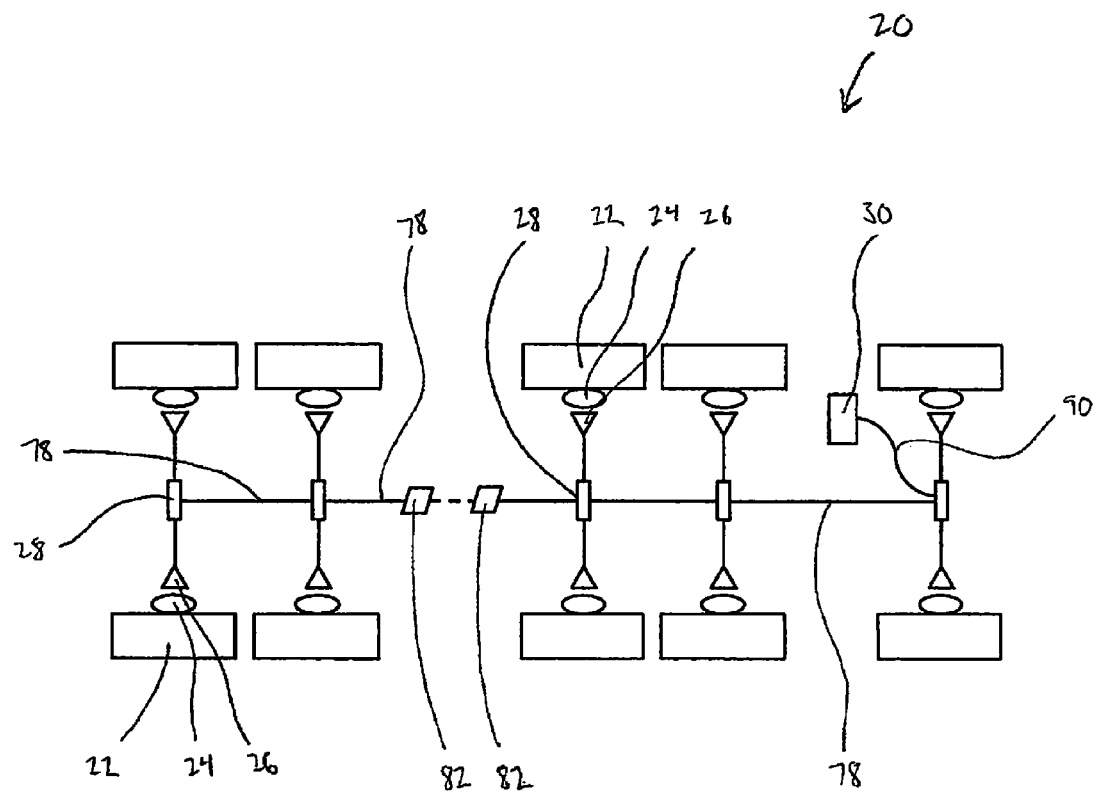
FIG. 1 is a schematic diagram of a braking system for a truck and a brake monitoring system for use therewith.

Highway transport vehicles, such as for example tractor-trailer trucks, comprise a tractor carrying a cab and one or more trailers connected to the tractor. FIG. 1 is a schematic diagram of a braking system, generally indicated by reference numeral 20, for a truck and a brake monitoring system for use therewith. As can be seen, the tractor-trailer truck comprises a tractor having three axles and a trailer having two axles. Each axle supports a plurality of wheels 22. Brake assemblies 24 are provided on the axles adjacent the wheels 22 to provide braking force to the wheels 22. System 20 comprises a plurality of brake monitoring apparatuses 26 that acquire sensor data from each brake assembly 24. This sensor data is communicated to an axle module 28 associated with each axle. The axle modules 28 are in communication with each other via communication cables 78, and are also in communication with a display module 30 having processing structure for processing the sensor data acquired by the brake monitoring apparatuses 26 for display. The display module 30 is also in communication with memory (not shown) and with a data logger (not shown), both of which comprise memory for the storage of the sensor data acquired by brake monitoring apparatuses 26. Display module 30 is also in communication with a display screen 32 (see FIGS. 14*a* to 14*d*, for example) for displaying the status of brake assemblies 24, or other information based on the data acquired by the brake monitoring apparatuses 26, to the driver of the truck.

Figure 2A:
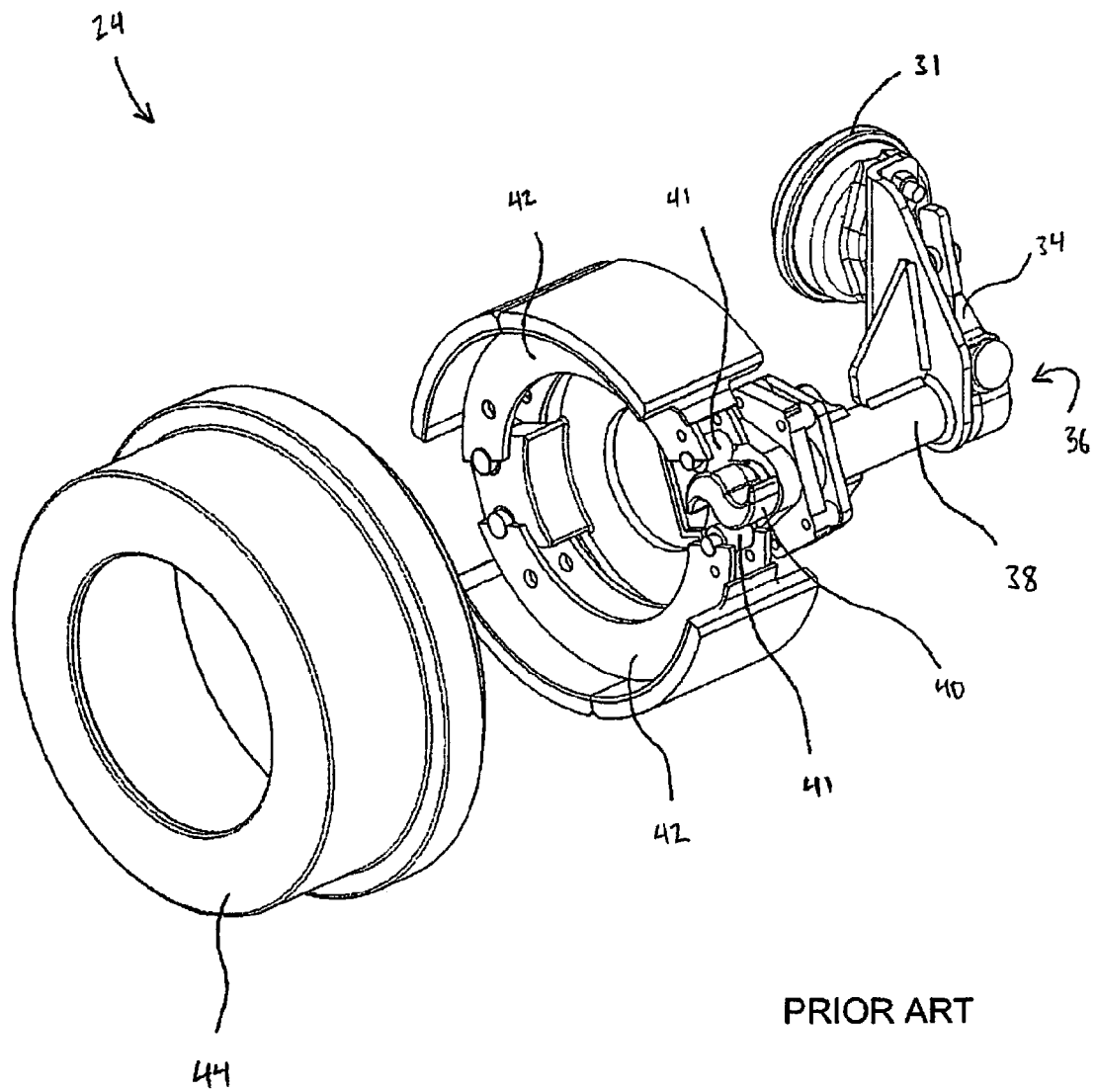
FIG. 2a is an exploded side perspective view of a prior art brake assembly.
Figure 2B:
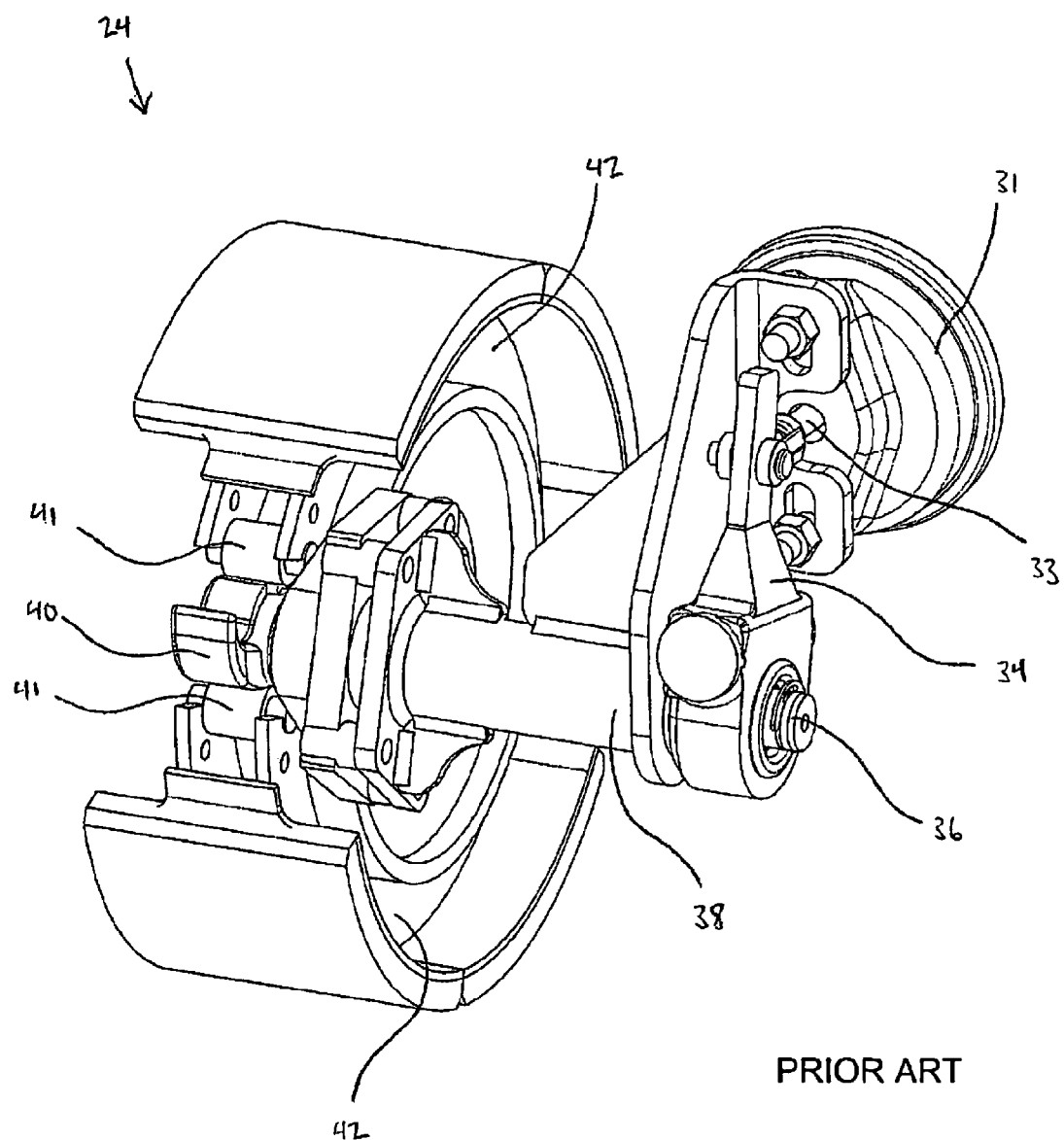

FIGS. 2*a* and 2*b* show one of the brake assemblies 24. Brake assembly 24 is a conventional air-powered drum brake. The interrelation of the constituent parts of brake assembly 24, as is known in the art, is clearly illustrated in FIG. 2*a*. More particularly, brake assembly 24 comprises an activator 31 containing a volume of pressurized air which, upon application of the brake pedal (not shown), applies pressure against a movable diaphragm (not shown) connected to a push rod 33. Push rod 33 is connected to a slack adjuster 34, which serves as a lever to convert the linear motion of push rod 33 to rotational motion of a brake camshaft 36 about the pivot axis of slack adjuster 34. Camshaft 36 is supported by one or more bushings in camshaft housing 38, which serve to stabilize camshaft 36 during operation. At the end of camshaft 36 that is distal to the push rod 33 is affixed an S-cam 40, which is so named due to its generally "S"-shaped profile. S-cam 40 is in turn in contact with two S-cam rollers 41, each of which is positioned to roll along a convex surface of S-cam 40 when camshaft 36 is rotated. Each S-cam roller 41 is rotatably seated within a receiving notch in brake shoes 42.

During operation of brake assembly 24, an application of pressure from activator 31 pushes push rod 33, which thereby in turn causes the rotation of camshaft 36 and S-cam 40. As S-cam 40 rotates, it accordingly rolls each S-cam roller 41 along the convex surface towards respective outer tips of S-cam 40. As each S-cam roller 41 rolls outward, the brake shoes 42 are pushed outwards from the camshaft 36 and from their respective resting positions toward an inner surface of a brake drum 44 to make frictional contact and thereby generate a braking force. Opposing this motion is a brake shoe return spring (not shown), which connects the brake shoes 42 together. The brake shoe return spring provides a tensile force that biases brake shoes 42 to their original resting positions (i.e. the "seated" positions), upon cessation of pressure from activator 31. As brake shoes 42 return to the seated positions, camshaft 36 is also forced to rotate back to its initial position. Accordingly, rotation of camshaft 36 back to its initial position causes push rod 33 to apply pressure to the movable diaphragm so as to return the moveable diagram to its initial position.

FIGS. 3 to 8 show the brake monitoring apparatus 26 and its relationship to brake assembly 24, onto which it is fitted, in greater detail. In this embodiment, brake monitoring apparatus 26 comprises two rotary sensors 48*a*, 48*b* that are configured to monitor the relative position of a sensor magnet 50 that is affixed to the end of camshaft 36. In this embodiment, each of the rotary sensors 48*a*, 48*b* is a non-contact rotary sensor that is capable of remotely sensing 360° of rotation of sensor magnet 50, as it moves relative to sensors 48*a*, 48*b* during braking action.

Rotary sensor 48*a* is mounted on a slack adjuster sensor assembly 52, which is itself mounted to slack adjuster 34. Rotary sensor 48*a* is configured for monitoring the position of slack adjuster 34 relative to sensor magnet 50 on camshaft 36. Rotary sensor 48*b* is mounted on an end sensor assembly 54 which is itself mounted to activator mount 35. Rotary sensor 48*b* is fixedly mounted relative to camshaft 36, and is configured for monitoring the relative rotational position of sensor magnet 50 on camshaft 36.

Figure 3A:
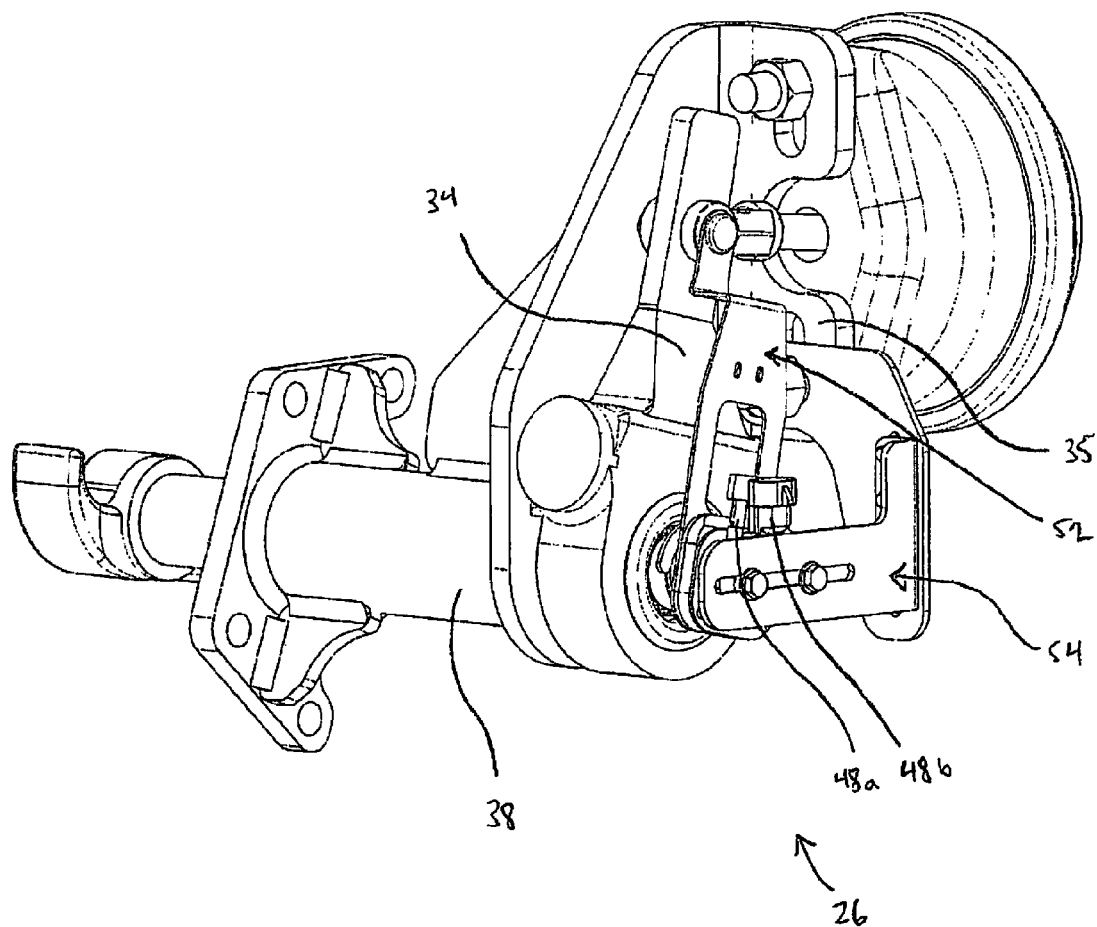
FIGS. 3a, 3b, and 3c are front perspective, top perspective, and close-up top perspective views, respectively, of a brake monitoring apparatus for use with the brake monitoring system of FIG. 1.
Figure 3B:
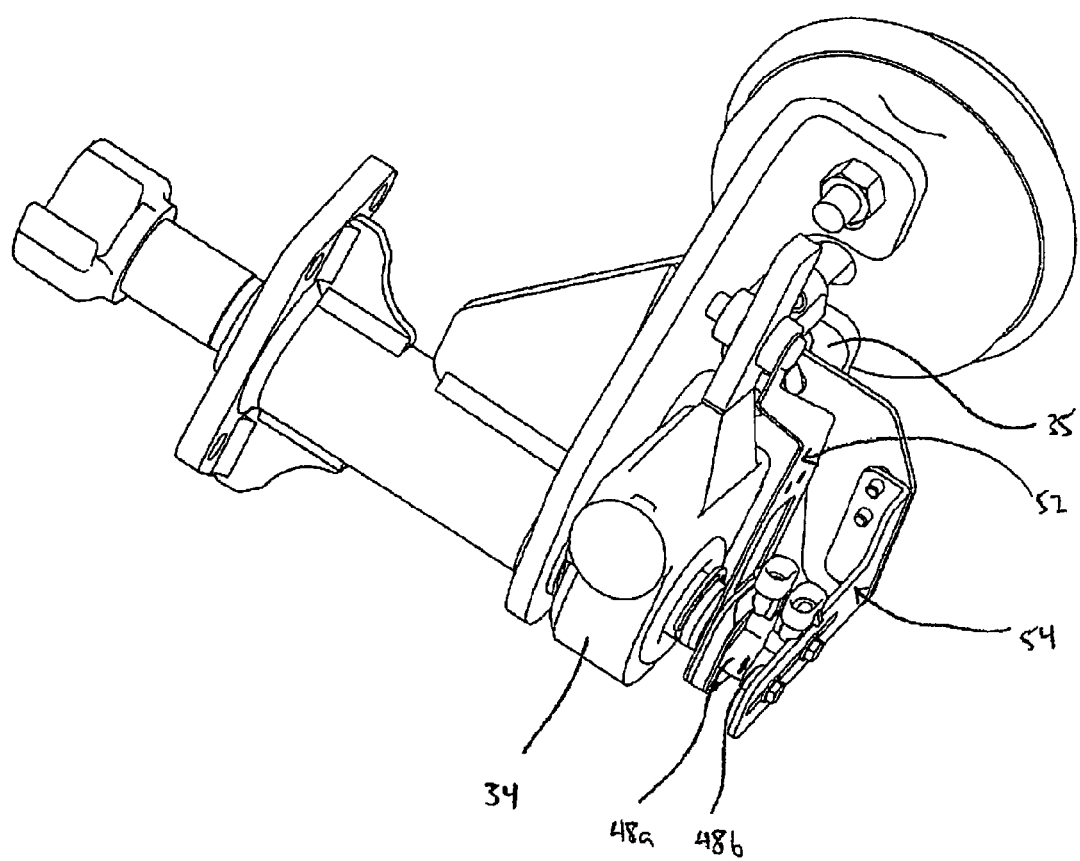
Figure 3C:
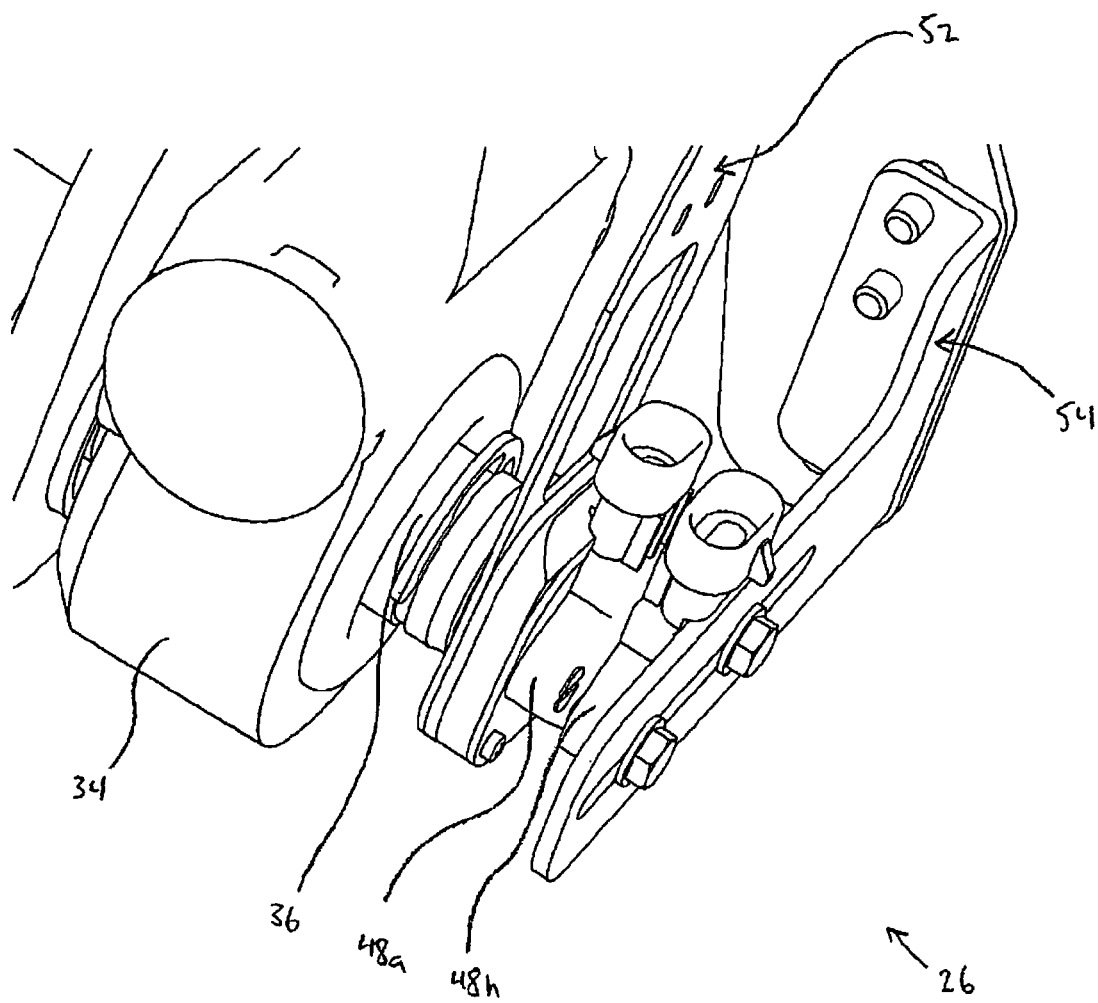
Figure 4:
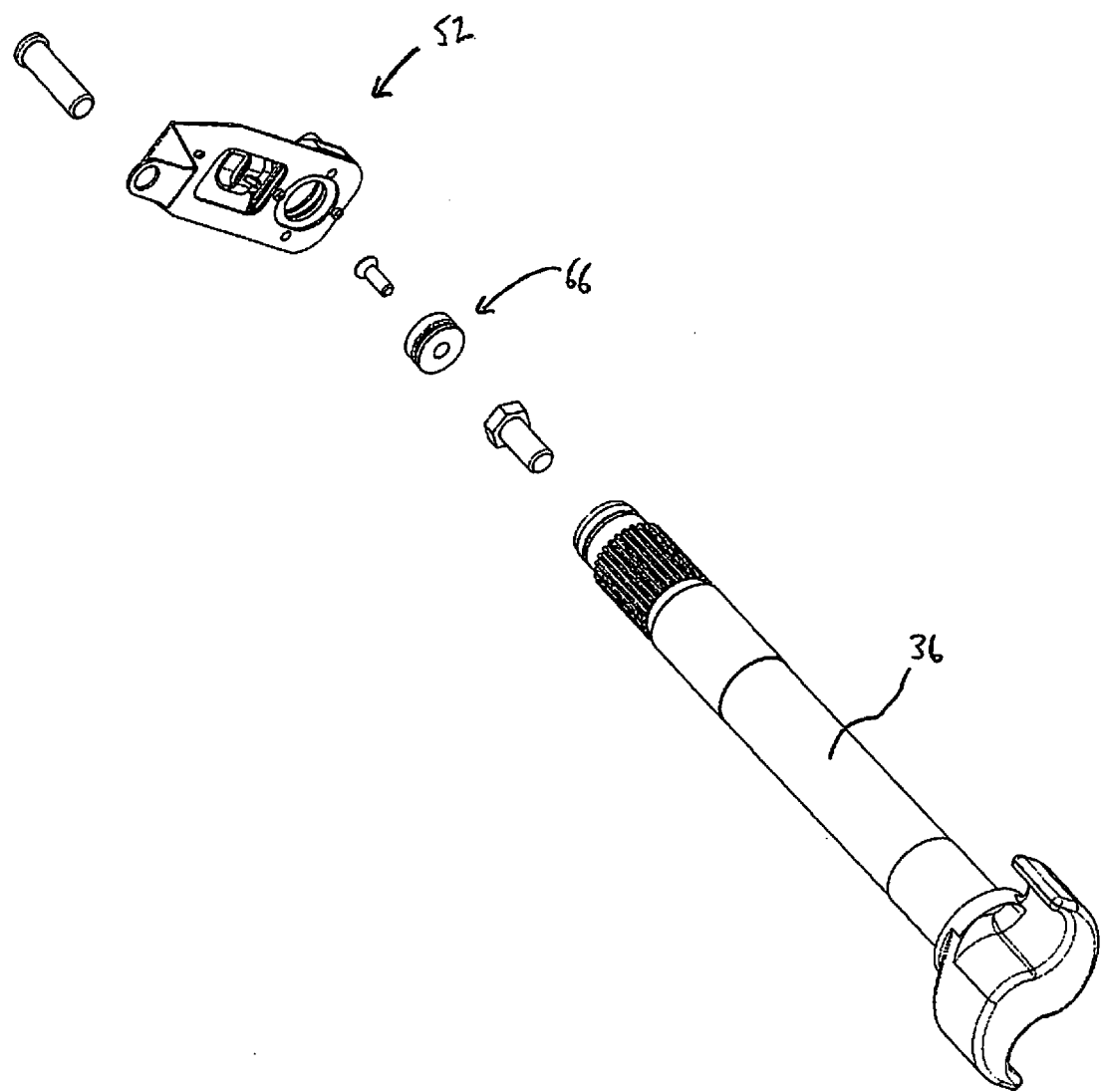
FIG. 4 is an exploded view of a brake camshaft, a slack adjuster sensor assembly, and a sensor magnet assembly for use with the brake monitoring apparatus of FIGS. 3a to 3c.
Figure 5A:
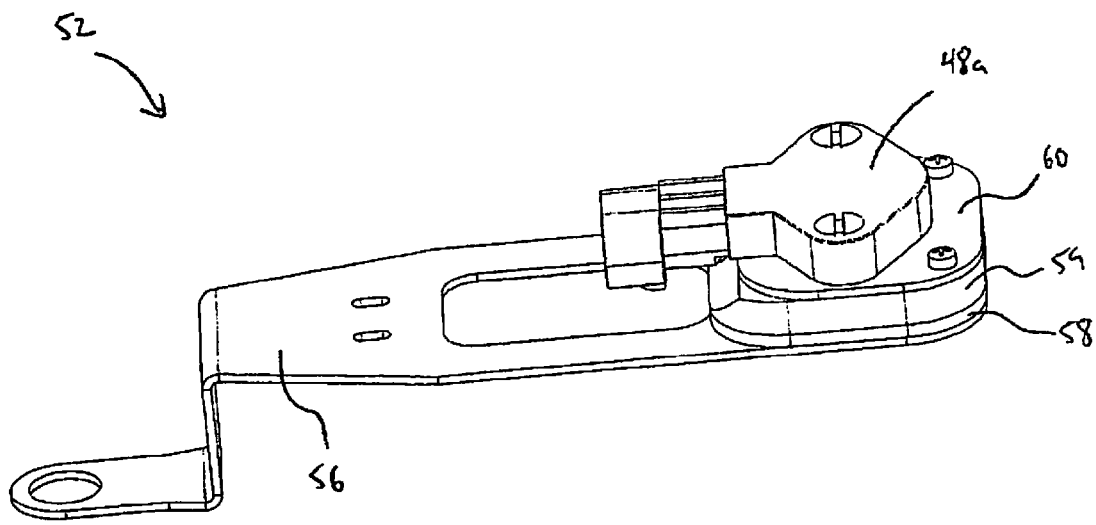
FIGS. 5a and 5b are top and bottom perspective views, respectively, of the slack adjuster sensor assembly for use with the brake monitoring apparatus of FIGS. 3a to 3c.
Figure 5B:
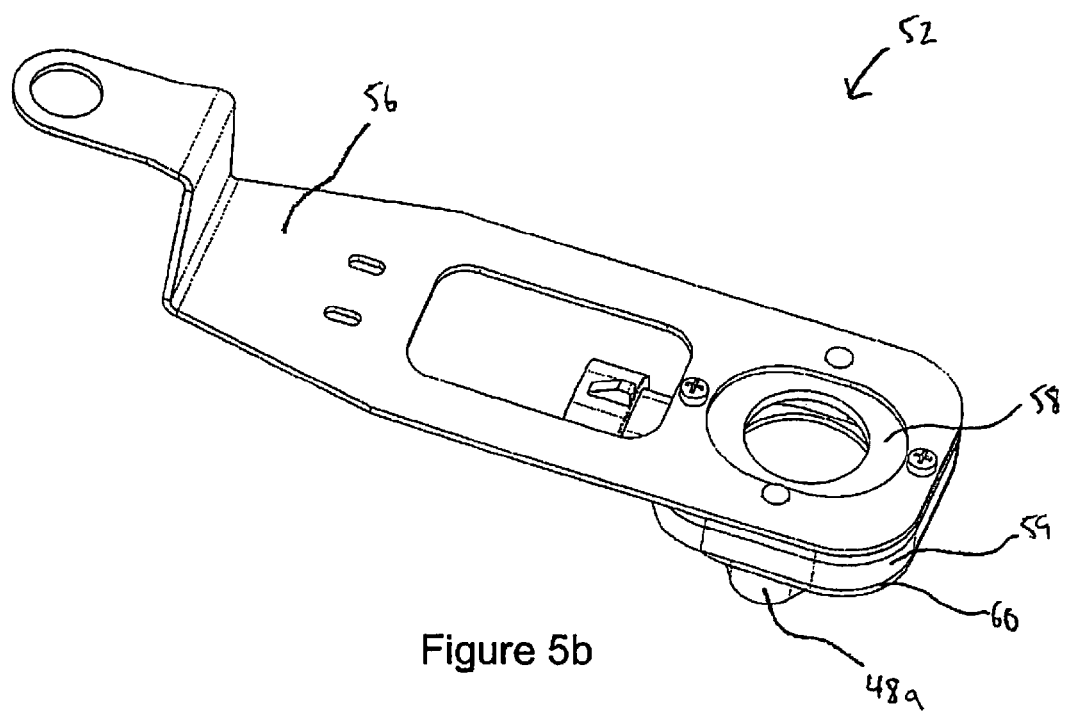

FIGS. 5*a* and 5*b* show the slack adjuster sensor assembly 52 in greater detail. Slack adjuster sensor assembly 52 comprises a bracket 56 that is configured to be mounted onto slack adjuster 34. Bracket 56 supports a bearing assembly comprising a neoprene bearing seal 58, a plastic spacer 59, and a metal gasket 60. As illustrated in FIGS. 3 and 4, slack adjuster sensor assembly 52 is positioned on slack adjuster 34 such that the center axis of the bearing assembly of slack adjuster sensor assembly 52 is aligned with the pivot axis of camshaft 36. Slack adjuster sensor assembly 52 additionally provides protection from dust and other environmental contaminants for sensor magnet 50 by providing substantial coverage of sensor magnet.

Also shown in FIGS. 5*a* and 5*b* is rotary sensor 48, which is mounted onto metal gasket 60. As can be seen, rotary sensor 48 also comprises a connector 61 for communication of sensor data to a respective axle module 28. As will be appreciated, the ability for rotary sensor 48 to remotely sense movement relative to sensor magnet 50 obviates the need for a direct mechanical connection between camshaft 36 and any sensors for the purpose of sensing. This configuration simplifies, and improves the accuracy of brake monitoring assembly 26, as compared to other brake monitoring assemblies that utilize such a mechanical connection.

Figure 6:
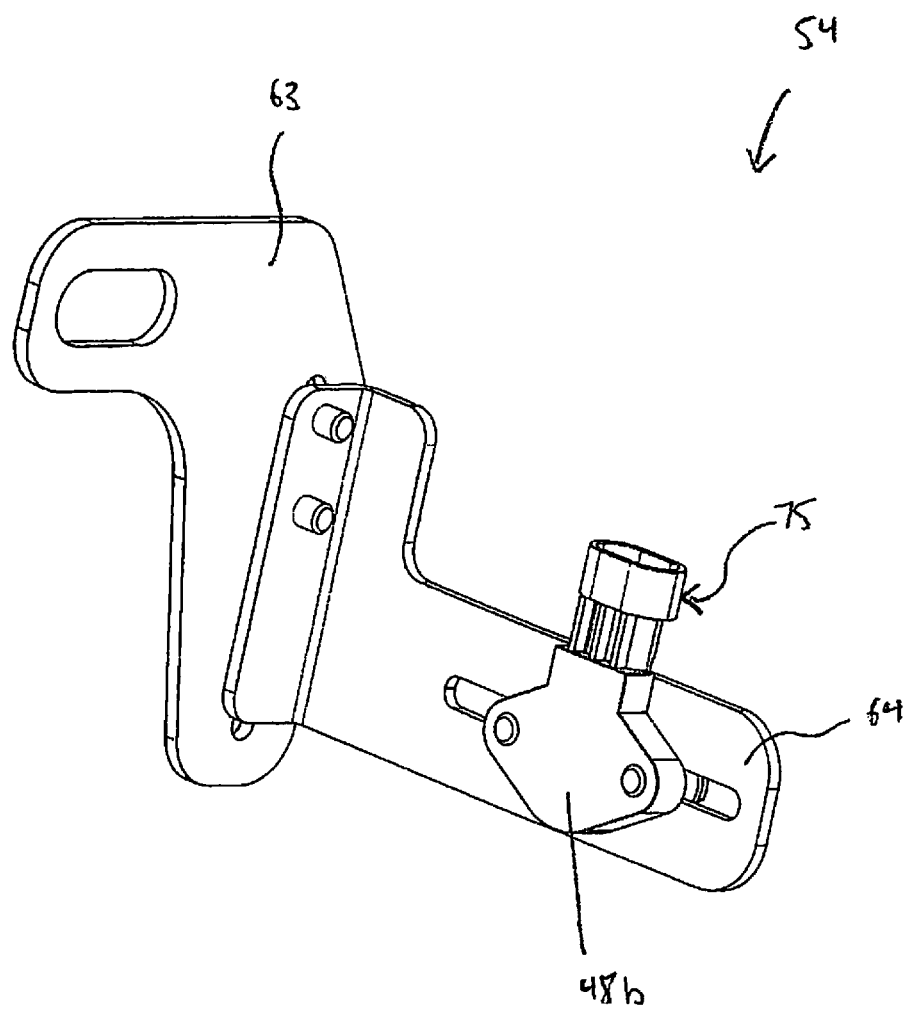
FIG. 6 is a perspective view of an end sensor assembly for use with the brake monitoring apparatus of FIGS. 3a to 3c.

FIG. 6 shows end sensor assembly 54 in greater detail. In this embodiment, end sensor assembly 54 comprises a first bracket component 63 and a second bracket component 64. Bracket components 63 and 64 are configured to be fastened to each other in an adjustable manner so as to accommodate the configuration of the particular braking assembly to which they are applied. Second bracket component 64 is configured to have a rotary sensor 48 fastened thereto. First bracket component 63 is in turn configured to be mounted to activator mount 35 using one or more fasteners through its aperture, as illustrated in FIGS. 3*a* to 3*c*.

FIGS. 7*a* to 7*c* shows sensor magnet assembly 66, which comprises sensor magnet 50 and a magnet mount 68. In this embodiment, sensor magnet 50 is a diametrically magnetized disc magnet. Sensor magnet 50 has a through-bore, and is sized to be seated on magnet mount 68 which, in this embodiment, is made of UHMW plastic. Magnet mount 68 has through bore and a counter sink for receiving a fastener, which may be used to fasten sensor magnet assembly 66 to an end of camshaft 36 for detection by rotary sensors 48. Magnet mount 68 also comprises a groove 67 for receiving a neoprene bearing seal 58 of slack adjuster sensor assembly 52, thereby allowing slack adjuster sensor assembly 52 to be aligned with sensor magnet assembly 66 and accordingly with the pivot axis of camshaft 36. In this manner, neoprene bearing seal 58 provides a bearing surface for the movement of sensor magnet assembly 66 relative to slack adjuster sensor assembly 52.

Figure 8:
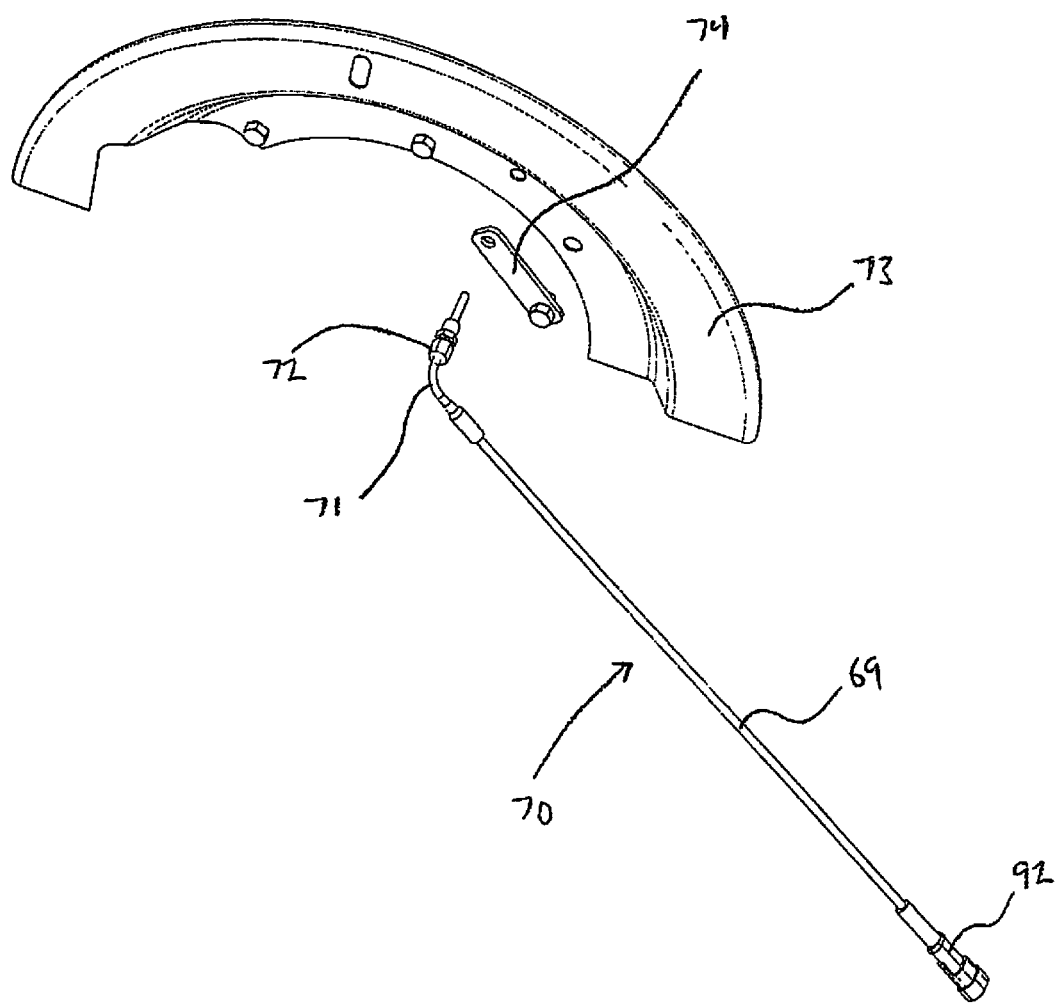
FIG. 8 is an exploded view of a temperature sensor assembly for use with the brake monitoring apparatus of FIGS. 3a to 3c.

In this embodiment, the brake monitoring apparatus 26 also includes a temperature sensor, which is generally indicated by reference numeral 70 and shown in FIG. 8. In the embodiment shown, temperature sensor 70 is a resistance temperature detector (RTD) manufactured by Intempco™ of Montreal, Quebec, Canada, and comprises a stainless steel sheath 71 encapsulating a RTD element. Sheath 71 is angled to provide both ease of installation and avoidance of debris. A compression fitting 72 is affixed to sheath 71 for in turn enabling temperature sensor 70 to be affixed to brake backing plate 73 by its connection to a temperature sensor bracket 74. Wiring connecting the RTD element of temperature sensor 70 to a connector 92 is encapsulated in a stainless steel armoured sheath 69.

Figure 9:
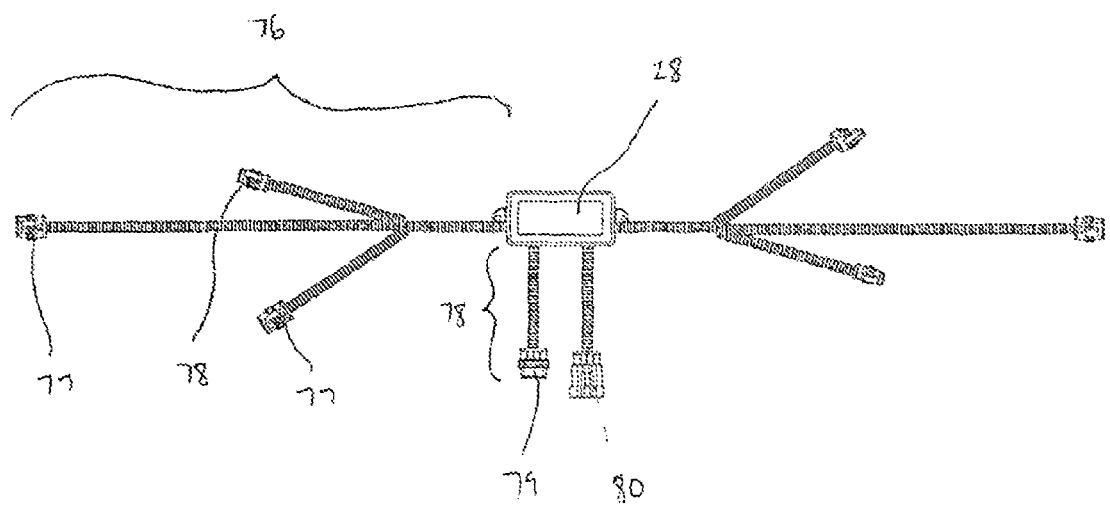
FIG. 9 is a plan view of an axle module for use with the brake monitoring system of FIG. 1.

As previously described, each brake monitoring apparatus 26 provides sensor data to a respective axle module 28 via sensor cable 76. An exemplary axle module 28 is illustrated in FIG. 9. In this embodiment, each sensor cable 76 comprises connectors 77 and 78 for electronically engaging with connectors 75 and 92 of respective ones of the rotary sensors 48*a*, 48*b* and the temperature sensor 70. Axle module 28 also comprises two communication cables 78 respectively terminated by a connector 79 and a connector 80. Communication cables 78 and connectors 79 and 80 enable the axle module 28 to engage in data communications with other axle modules 28 on adjacent axles, or with wireless transceivers 82, or with processing structure located within the display module 30, thereby enabling sensor data acquired by each of the brake monitoring apparatuses 26 to be communicated to the display module 30.

Figure 10:
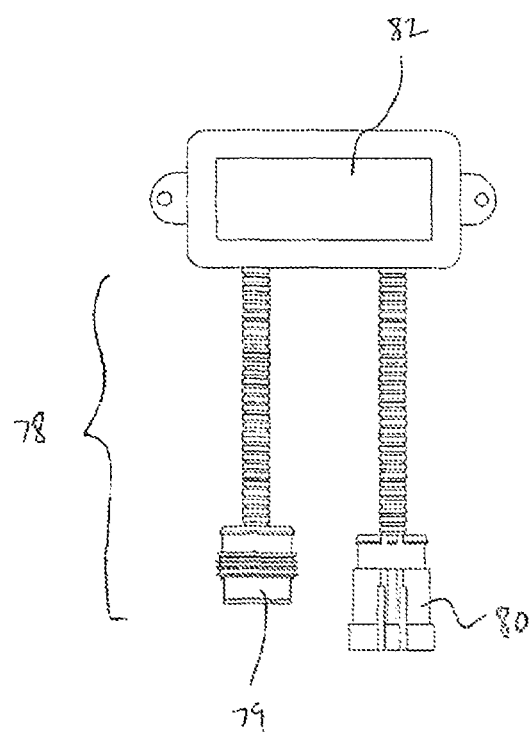
FIG. 10 is a plan view of a transceiver module for use with the brake monitoring system of FIG. 1.

A wireless transceiver 82 used for the wireless communication of sensor data between the trailer and the tractor is shown in FIG. 10. In the embodiment shown, transceiver 82 comprises two communication cables 78 respectively equipped with a connector 79 and a connector 80, for the communication of sensor data between axle modules 28 located on the axles of the trailer and axle modules 28 located on the axles of the tractor. In this embodiment, communication between the trailer and the tractor is wireless, but it will be appreciated that this communication may alternatively be wired.

Figure 11:
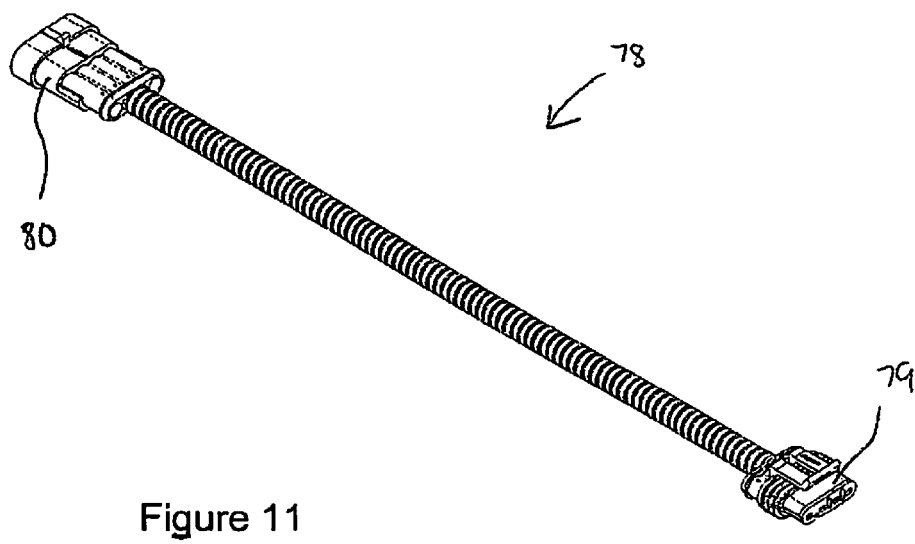
FIG. 11 is a perspective view of a communication cable for use with the brake monitoring system of FIG. 1.

FIG. 11 illustrates communication cable 78 in detail. Communication cable 78 is terminated by a connector 79 at one end and a connector 80 at the other end. In the embodiment shown, communication cable 78 is a 4-conductor cable, and connectors 79 and 80 are four-position Super Seal™ connectors, with connector 79 being a female connector and connector 80 being a male connector. Those of skill in the art will appreciate that the cable and connectors need not be limited to the specific types shown, provided that they function to convey data as described.

Figure 12:
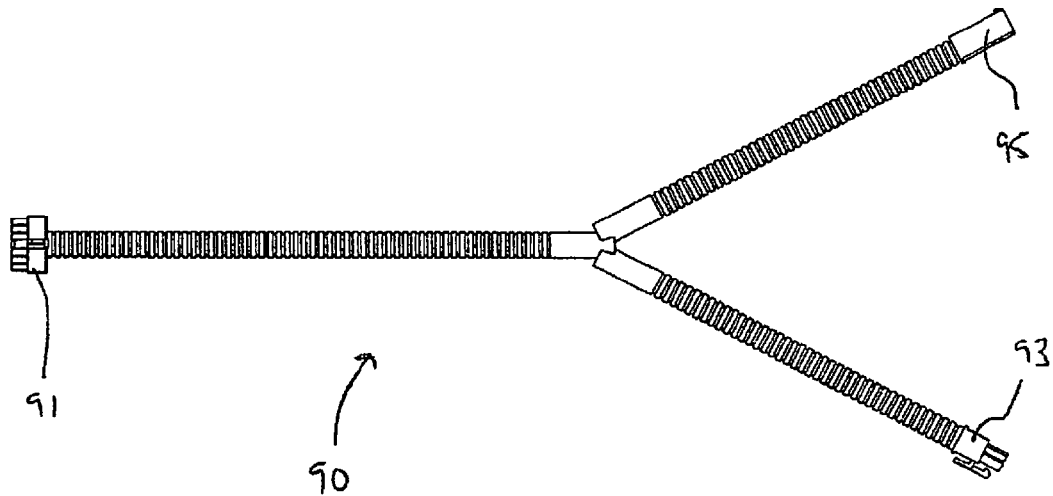
FIG. 12 is a plan view of a display communication cable for use with the brake monitoring system of FIG. 1.

FIG. 12 shows a display communication cable 90, which connects an axle module 28 to display module 30 through communication port 93 on a motherboard 84 that supports the processing structure. In this embodiment, display communication cable 90 comprises a connector 94 for engaging a cable communicating with an axle module 28, and a connector 91 for engaging communication port 93 of display module 30. Communication cable 93 also comprises a connector 95 for connecting display module 30 to a power source.

Figure 13A:
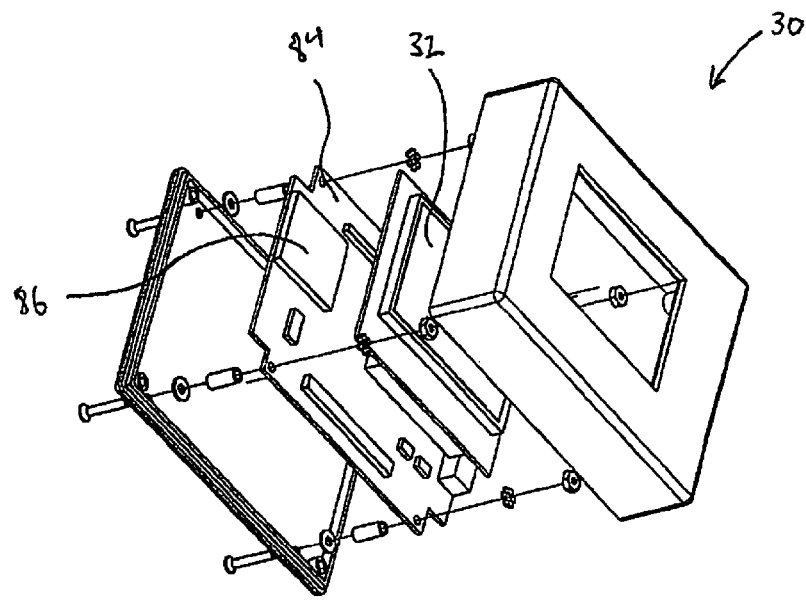
FIGS. 13a and 13b are an exploded perspective view of a display module, and a perspective view of a controller board for the display module, respectively, for use with the system of FIG. 1.
Figure 13B:
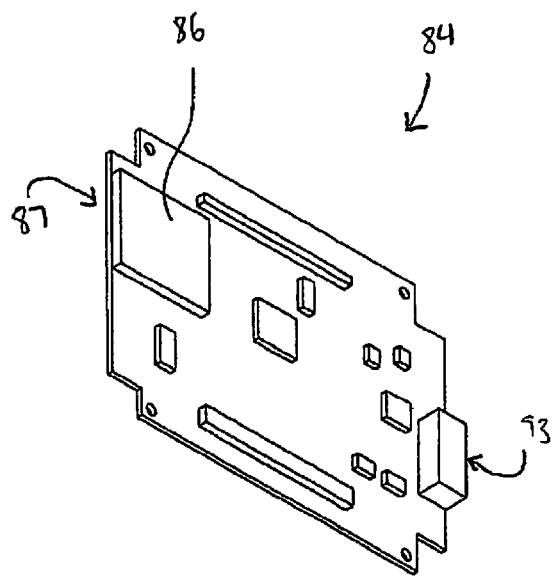

FIGS. 13*a* and 13*b* show display module 30 in greater detail. Display module 30 comprises a motherboard 84 supporting the processing structure for processing the sensor data acquired by brake monitoring apparatuses 26, and provided to the processing structure via a communication port 93. The processing structure comprises a Digital Signal Processor ("DSP"). Other suitable processing devices may alternatively be employed. Display module 30 is also in communication with a data logger 86 that comprises electronic memory for the storage of data acquired by the brake monitoring apparatuses 26. In this embodiment, data logger 86 is a removable memory card that can be removably connected to a connector slot 87 of motherboard 84. Also connected to the components on motherboard 84 is the display screen 32. In this embodiment, display screen 32 is an interactive touch screen, which permits the driver of the vehicle to select from a number of display options presented on display screen 32 with a pointer such as a finger.

FIGS. 14*a* to 14*d* show an embodiment of an application program running on the processing structure from non-volatile memory for use with the brake monitoring system 20. FIG. 14*a* shows the display screen 32 displaying a "menu screen". This screen allows the driver to view a variety of data by selecting from the displayed choices of "stroke", "temperature", and "wear". FIG. 14*b* shows the "stroke" screen, in which a stroke length of each brake assembly 24 is displayed as a color-coded horizontal bar. In the embodiment shown, the length of the bar is proportional to the stroke length value and the colour is indicative of the status of the stroke length value, which therefore allows easy visual identification of the brake stroke condition. The stroke lengths are calculated based on programmable limits entered into the system by the user, and the length and colour of each of the horizontal bars is thereby determined accordingly. FIG. 14*c* shows the "temperature" screen, in which the temperature of each brake is displayed. The units of temperature displayed (Celsius or Fahrenheit) may be selected by the driver. As the programmable temperature limits are approached, the numbers change colour from green to yellow to red. FIG. 14*d* shows the "wear" screen, in which the brake wear is displayed quantitatively as both a percentage and as a colour-coded horizontal bar, with the colour and length of the bar being representative of the wear percentage, based on the programmable limits. In this embodiment, a percentage of 100% corresponds to 120 degrees of rotation of camshaft 36. As is known in the art, wear is related to such rotation of camshaft 36 through the self-adjustment of slack adjuster 34 relative to push rod 33, whereby slack adjuster 34 automatically ratchets along push rod 33 to eliminate slack in the system as necessary; each such self-adjustment of slack adjuster 34 results in change in the rotational starting point of camshaft 36, resulting in an increase in the rotational movement of camshaft 36 detected by the system. As will be appreciated, the interactive touch capability of display screen 32 allows the application to be user friendly, and is of a large size and color-coded such that any information displayed may be easily read by the driver at a glance.

Figure 15:
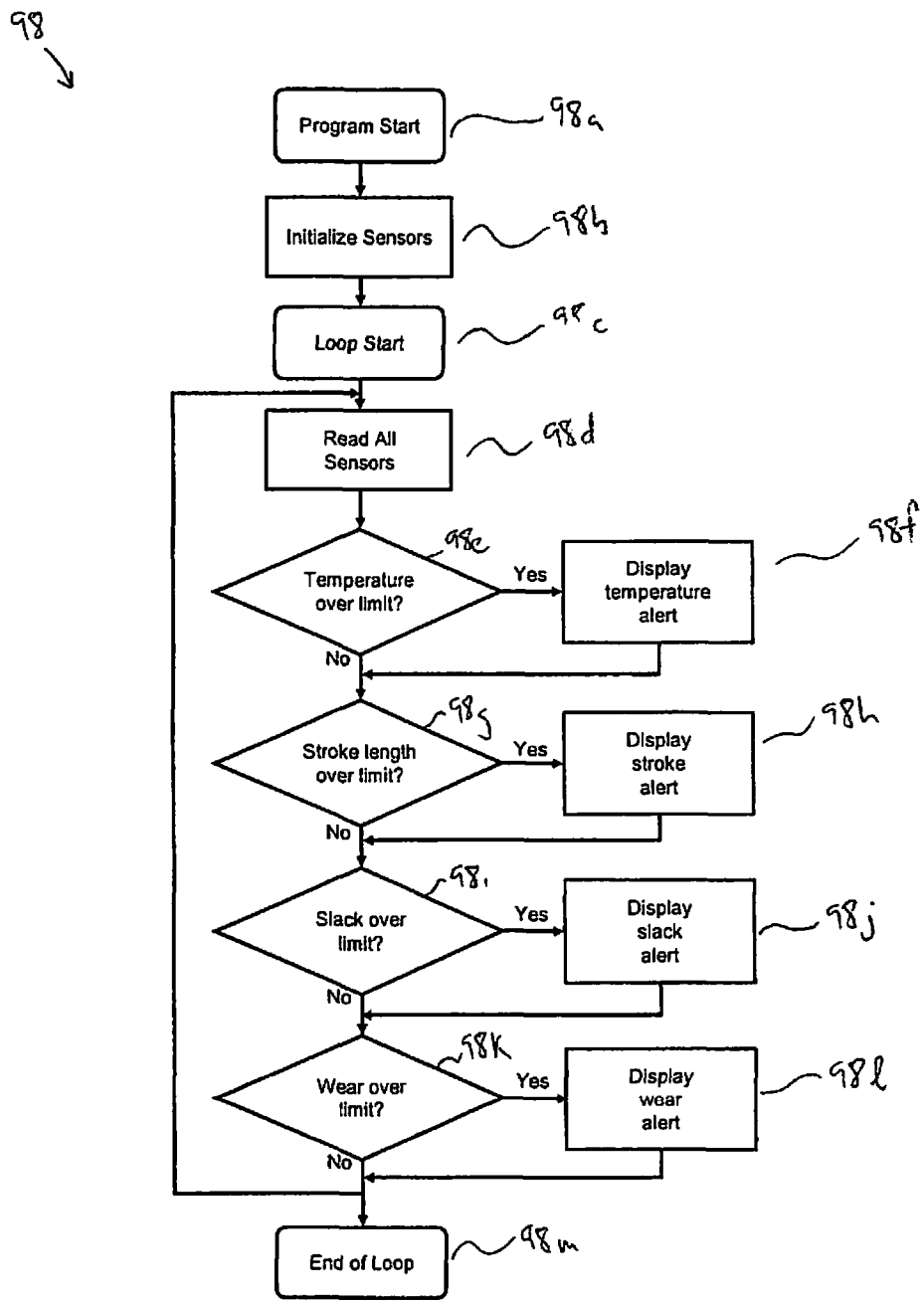
FIG. 15 is a flowchart providing an operational overview of the brake monitoring system of FIG. 1.

FIG. 15 shows an overview of the steps in the method undertaken by the processing structure to analyze the acquired sensor data and display useful information, the method being generally indicated by reference numeral 98 and described below.

In operation, upon application of vehicle brakes by the driver, push rod 33 extends from activator 31, which causes slack adjuster to rotate and to take up any available slack between splines on slack adjuster 34 and splines on camshaft 36. As slack adjuster 34 rotates, rotary sensor 48 mounted on slack adjuster sensor assembly 52 rotates relative to sensor magnet 50 affixed to the end of camshaft 36. This relative movement is detected by rotary sensor 48, which is continuously acquiring relative rotational position data and communicating it to axle module 28. As slack adjuster 34 continues to rotate, the available slack is eliminated and the splines on slack adjuster 34 engage the splines on camshaft 36, causing the unified rotation of slack adjuster 34, camshaft 36, and S-cam 40. The rotation of camshaft 36 in turn results in the pressing of the brake shoe 42 against the brake drum 44, and is therefore intimately linked to the braking action. Sensor magnet 50 rotates together with camshaft 36, and this relative motion is sensed by the rotary sensor 48 mounted on end sensor assembly 54. The relative rotational position data from both rotary sensors 48 is continuously acquired and communicated to axle module 28. Temperature data of the brake assembly is also continuously acquired by temperature sensor 70 and communicated to axle module 28. Both relative rotational position data and temperature data are in turn communicated by axle module 28 to display module 30 by way of communication cables 78, axle modules 28, and transceivers 82, as described above.

The processing structure of display module 30 processes the temperature data to assess the temperature conditions of brake assembly 24. Here, the measured temperature value is compared to a temperature limit value stored in memory of display module 30 (step 98e). If the temperature limit value is exceeded by the measured temperature value, an alarm condition is displayed (step 98f). Otherwise, the temperature is displayed numerically graphically on the "temperature" screen of display module 30, as illustrated in FIG. 14c.

The processing structure of display module 30 processes the rotational data acquired by rotary sensors 48 to assess the slack, the stroke, and the wear of brake assembly 24. The slack is measured as the initial rotational movement of rotary sensor 48 mounted on slack adjuster sensor assembly 52 relative to sensor magnet 50. Once the available slack has been taken up, camshaft 36 begins to rotate in unison with slack adjuster 34 and no relative movement is detected by this rotary sensor 48. The value of the measured slack is compared to a reference value of slack stored in the memory of display module 30 to determine if the slack exceeds a predefined limit (step 98g). If the limit is exceeded, an alarm condition is displayed on display module 30 (step 98h).

The stroke length is calculated as the sum of the slack and the camshaft rotation, namely the sum of the above-described slack and the rotational movement of sensor magnet 50 on camshaft 36 relative to rotary sensor 48 on end sensor assembly 54. This calculated value of stroke length is compared to a reference value of stroke length stored in the memory of display module 30 to determine if the stroke exceeds a predefined limit (step 98i). If the limit is exceeded, an alarm condition is displayed on display module 30 (step 98j). Otherwise, the stroke length is displayed graphically on the "stroke" screen of display module 30, as illustrated in FIG. 14b, in which the length of the horizontal bar corresponds to a brake stroke length.

The wear is calculated using the camshaft rotation, and namely the rotational movement of sensor 50 on camshaft 36 relative to rotary sensor 48 on end sensor assembly 54. This measured value of camshaft rotation is compared to a reference value of camshaft rotation stored in memory of display module 30 (step 98k). In the event that the measured value is greater than the reference value, the difference is attributed to wear. If the limit is exceeded, an alarm condition is displayed on display module 30 (step 98l). Otherwise, the wear is displayed graphically on the "wear" screen of display module 30, as illustrated in FIG. 14d, in which the length of the horizontal bar corresponds to a percentage of wear. In this embodiment, a value of 100% corresponds to 120 degrees of rotation of camshaft 36. The processing structure of display module 30 records brake activity to the data logger 86 at predefined intervals.

Figure 16:
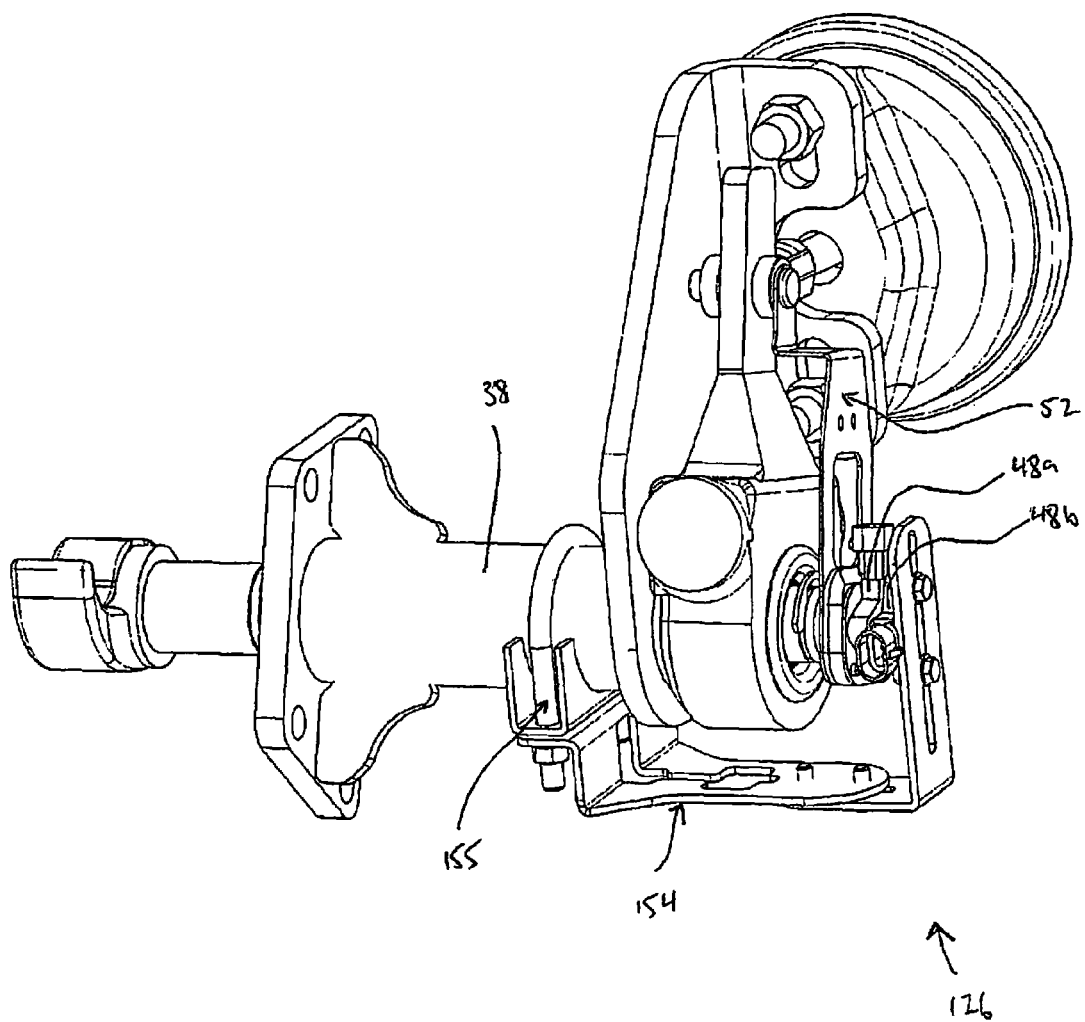
FIG. 16 is a perspective view of another embodiment of a brake monitoring apparatus for use with the brake monitoring system of FIG. 1.

FIG. 16 shows a brake assembly 24 to which is fitted another embodiment of a brake monitoring apparatus, generally indicated by reference numeral 126. Similar to brake monitoring apparatus 26 described above with reference to FIGS. 3 to 8, brake monitoring apparatus 126 comprises two rotary sensors 48a, 48b that are each configured to monitor the relative rotational position of a sensor magnet 50 affixed to an end of camshaft 36. Rotary sensor 48a is mounted on a slack adjuster sensor assembly 52, which is itself mounted to slack adjuster 34. Rotary sensor 48a is configured for monitoring the position of the slack adjuster relative to the sensor magnet 50 on camshaft 36. Rotary sensor 48b is mounted on a U-bolt end sensor assembly 154, which is itself fixedly mounted to camshaft housing 38 using a U-shaped bolt assembly 155. Rotary sensor 48b is configured for monitoring the relative rotational position of the sensor magnet 50 on camshaft 36. Those of skill in the art will appreciate that use of the U-bolt end sensor assembly 154 provides an alternative and simpler approach for mounting rotary sensor 48b, as compared to end sensor assembly 54 described above, and can be used with brake assemblies 24 for which access to the end of camshaft 36 or to activator mount 35 is limited.

Figure 17:
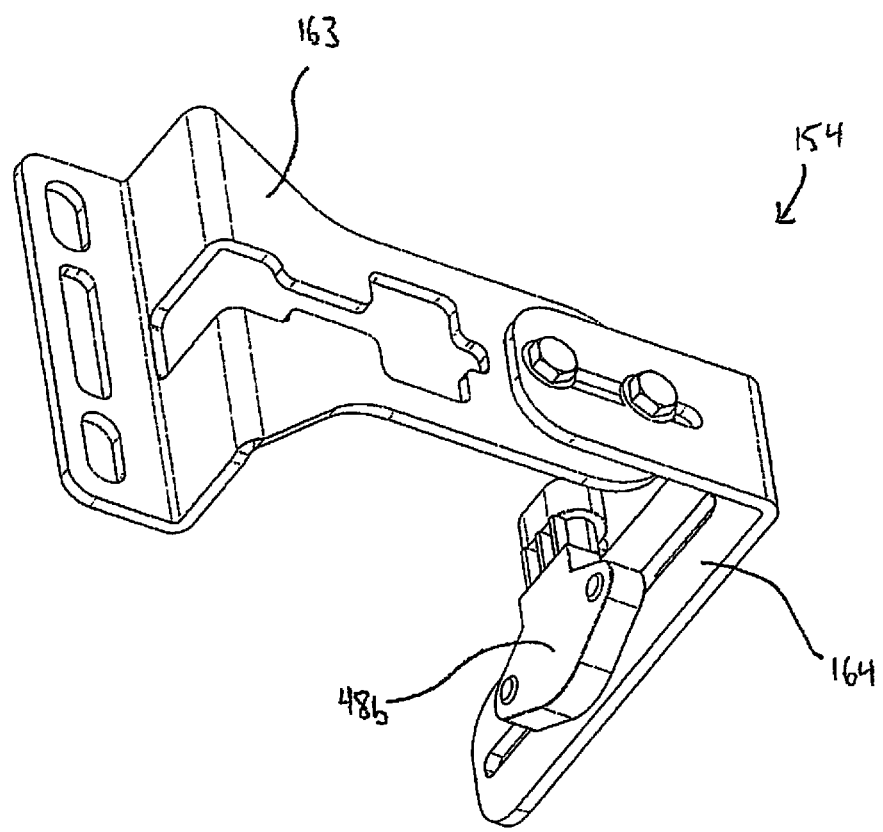
FIG. 17 is a perspective view of a end sensor assembly for use with the brake monitoring apparatus of FIG. 16.

FIG. 17 shows U-bolt end sensor assembly 154 in greater detail. U-bolt end sensor assembly 154 comprises a first bracket component 163, and a second bracket component 164 which is configured to be adjustably fastened to first bracket component 163. Second bracket component 164 has a rotary sensor 48b fastened thereto. First bracket component is in turn configured to be mounted to camshaft housing 38 by means of U-shaped bolt assembly 155.

Figure 18:
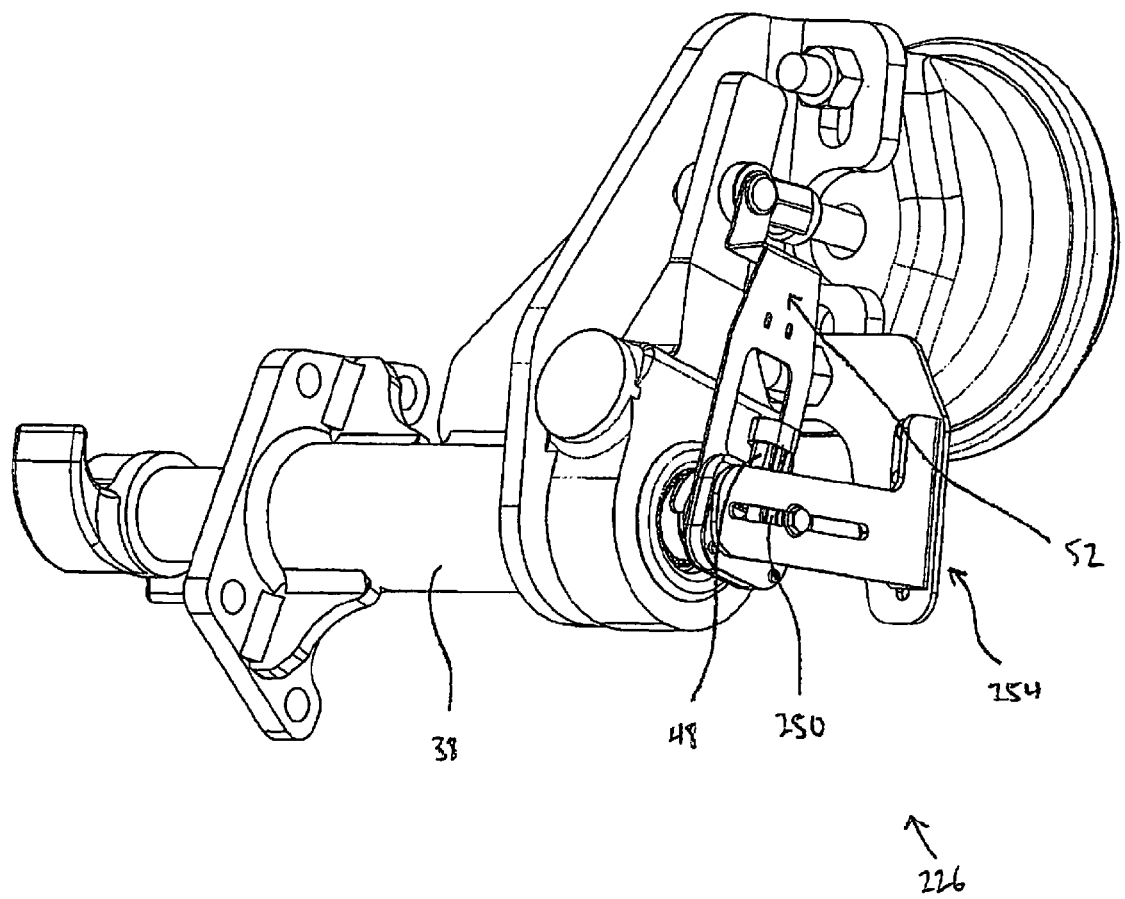
FIG. 18 is a perspective view of another embodiment of a brake monitoring apparatus for use with the brake monitoring system of FIG. 1.

FIG. 18 shows a brake assembly 24 to which is fitted another embodiment of a brake monitoring apparatus, generally indicated by reference numeral 226. Brake monitoring apparatus 226 comprises a single rotary sensor 48 mounted on slack adjuster sensor assembly 52, which is itself mounted to slack adjuster 34. Rotary sensor 48 is configured for monitoring the rotational position of the slack adjuster at the pivot axis of camshaft 36 relative to the sensor magnet 50, which is itself fixedly mounted to a sensor magnet bracket assembly 254 mounted to activator mount 35. As will be appreciated, as compared to brake monitoring apparatus 26, brake monitoring apparatus 226 provides a simplified apparatus for the monitoring of only the brake stroke of brake assembly 24, and in which only the movement of slack adjuster sensor assembly 52 relative to sensor magnet 50 is monitored.

Figure 19A:
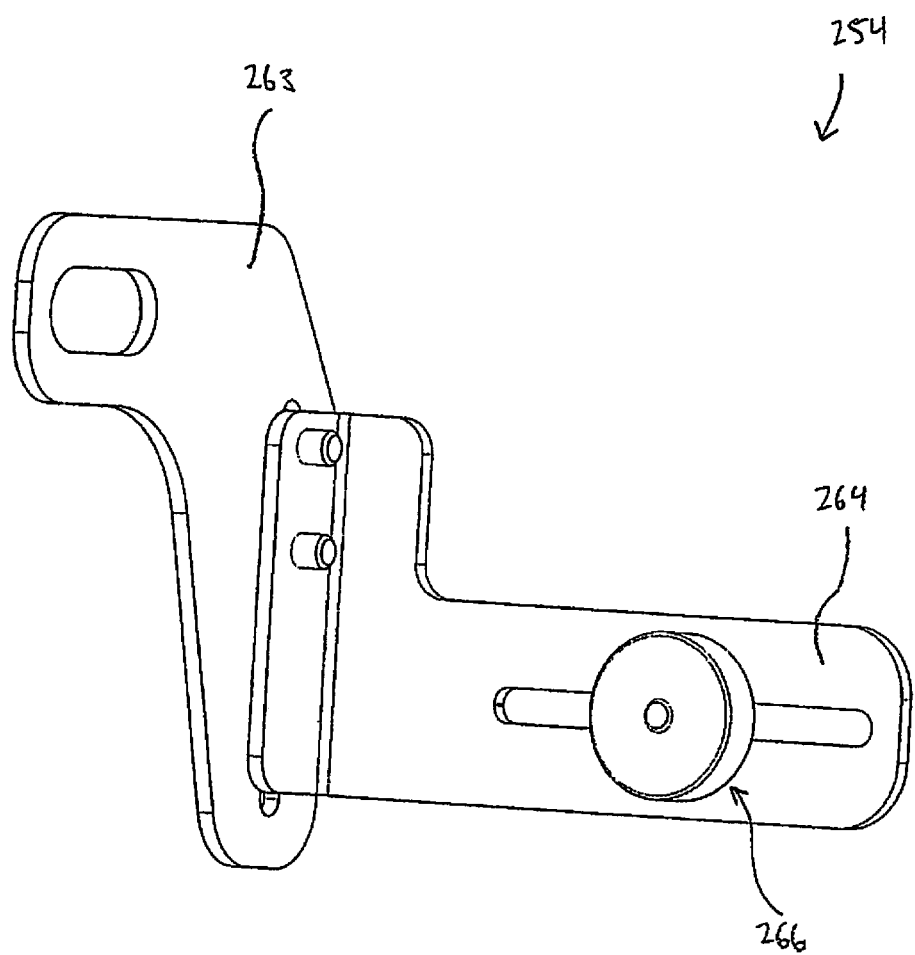
FIGS. 19a, 19b, and 19c are a perspective view of a sensor magnet bracket assembly, a front perspective view of a sensor magnet mount, and a rear perspective view of a sensor magnet assembly, respectively, for use with the brake monitoring apparatus of FIG. 18.

FIG. 19a shows sensor magnet bracket assembly 254 in greater detail. Sensor magnet bracket assembly 254 comprises a first bracket component 263, and a second bracket component 264 which is configured to be adjustably fastened to first bracket component 263. Second bracket component 264 is configured to have a sensor magnet assembly 266 fastened thereto. First bracket component is in turn configured to be mounted to activator mount 35, as is shown in FIG. 18.

Figure 19B:
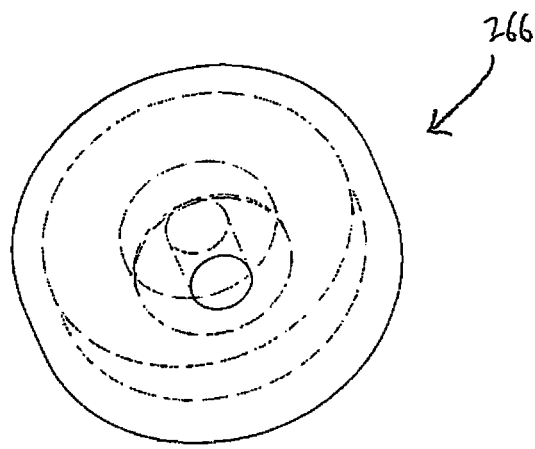
Figure 19C:
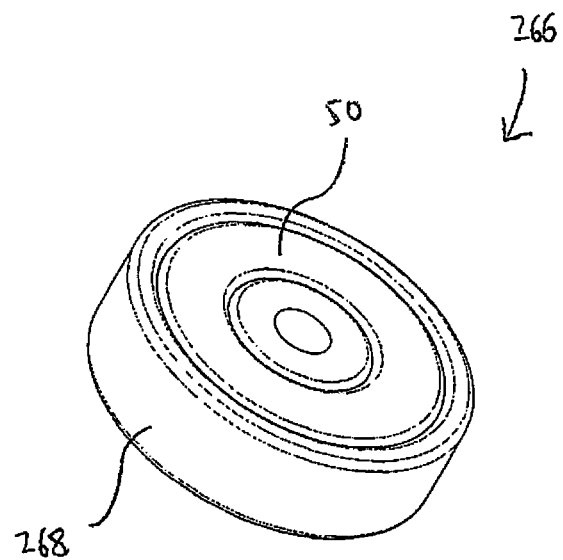

FIGS. 19b and 19c show the sensor magnet assembly 266 in greater detail. Sensor magnet assembly 266 comprises a sensor magnet 50 that is sized to be seated within a sensor magnet mount 268. Magnet mount 268 has a central aperture for receiving a fastener, which is used to fasten sensor magnet assembly 266 to sensor magnet bracket assembly 254.

Although in embodiments described above the brake monitoring system is used to process and display data acquired from brake monitoring systems, in other embodiments, the system may in addition be to process and display data gathered from non-brake related sensors on the vehicle, such as, but not limited to, cargo temperature, refrigerator operational status, and trailer door open/closed status. In another embodiment, the system can gather and monitor data concerning the identity of the trailer, together with the time of identification, so as to create a chronological record of trailer connections to the tractor for the purpose of fleet accounting.

Although in embodiments described above the brake monitoring apparatus comprises one temperature sensor placed in thermal communication with the brake assembly, the apparatus may alternatively comprise any number of temperature sensors placed in thermal communication with the brake assembly.

Although in the embodiments described above the display module is in wired communication with the plurality of axle modules, in other embodiments, the display module may alternatively be in wireless communication with the plurality of axle modules through the transceivers.

In the embodiments described above, the data logger is a removable memory card. The removability of the memory card facilitates record keeping and the installation of software, and also enables the data logger to be readily used to provide proof of compliance for servicing and operational inspections. However, the data logger may alternatively be non-removable with respect to the motherboard.

Although in embodiments described above the brake monitoring system is configured to monitor stroke, temperature, and wear, in other embodiments the system may alternatively be configured to monitor any one or more of stroke, temperature, and wear.

Although in embodiments described above the display module is configured to display "menu", "stroke", "temperature", and "wear" screens, in other embodiments the display module may alternatively be configured to display any screen on which data processed by the brake monitoring system is displayed. In other embodiments, the display module is configured to display a "slack" screen in addition to "menu", "stroke", "temperature", and "wear" screens.

Although in embodiments described above the brake monitoring system is configured to monitor all of the brake assemblies of the vehicle, in other embodiments the system may be configured to monitor only one or more of the brake assemblies of the vehicle.

Although in embodiments described above the brake monitoring apparatus comprises at least one rotary sensor, in another embodiment the brake monitoring apparatus may comprise no rotary sensors and may instead only comprise temperature sensors for use with a brake monitoring system that operates in a "temperature only mode". In this embodiment, wear is calculated from energy developed in the brake shoes of the brake assembly, and the acquired temperature data is displayed, for example, as temperature as a function of time, from which brake assembly status may be determined and from which non-activating, hung or dragging brakes may be identified.

Although in embodiments described above the brake monitoring apparatus utilizes a rotary sensor for detecting a sensor magnet, and thus detects relative camshaft motion magnetically, in other embodiments the brake monitoring apparatus detects relative camshaft motion in another manner, such as for example optically, and whereby for example the sensor may comprise at least one light detector and the camshaft may comprise a reflective surface configured for reflecting light detectable by the at least one light detector.

In the embodiments described above, the temperature values recorded using the temperature sensors can be compared to ambient temperature for the purpose of determining safe or unsafe operating conditions. Ambient temperature is measured by a temperature sensor housed in each axle module. Alternatively, in other embodiments, the temperature of a given brake assembly is compared to that of the opposite brake assembly on the axle. Alternatively, ambient temperature may be subtracted from the brake assembly temperature, and monitored over multiple measurements to determine braking power developed per brake assembly. This braking power may be expressed as change in temperature/time, and such historical data can be used to infer brake wear, for example.

Although embodiments have been described above with reference to the accompanying drawings, those of skill in the art will appreciate that variations and modifications may be made without departing from the spirit and scope thereof as defined by the appended claims.

What is claimed is:

1. A vehicle brake monitoring system comprising:
   a magnet mounted adjacent an end of a brake camshaft, the brake camshaft being rotatable during vehicle braking and causing the magnet to rotate;
   a first non-contact magnetic sensor spaced axially from the end of said brake camshaft and fixed in position relative to said brake camshaft, said first non-contact magnetic sensor configured to sense continuously rotation of said magnet during vehicle braking and generate corresponding output;
   a second non-contact magnetic sensor moveable with a slack adjuster during vehicle braking, said second non-contact magnetic sensor spaced axially from the end of said brake camshaft and configured to sense continuously relative movement of said magnet and second non-contact magnetic sensor during vehicle braking and generate corresponding output; and
   processing structure communicating with the first and second non-contact magnetic sensors, the processing structure configured to process the output of the first non-contact magnetic sensor to determine brake wear and process the output of the second non-contact magnetic sensor to determine brake stroke length.

2. A system according to claim 1, wherein the second non-contact magnetic sensor is fixedly mounted on a bracket coupled to said slack adjuster.

3. A system according to claim 2, wherein the first non-contact magnetic sensor is axially aligned with the brake camshaft and is fixedly mounted on a stationary component of the vehicle brake.

4. A system according to claim 1, further comprising at least one temperature sensor communicating with the processing structure and configured to measure temperature adjacent the vehicle brake.

5. A system according to claim 4, further comprising a display screen in communication with the processing structure, the display screen configured to display information indicative of the determined brake wear and brake stroke length and the brake temperature.

6. A system according to claim 1, wherein the processing structure is configured to compare first and second non-contact magnetic sensor output to previous first and second non-contact magnetic sensor output.

7. A system according to claim 1, further comprising a display screen in communication with the processing structure, the display screen configured to display information indicative of the determined brake wear and brake stroke length.

8. A system according to claim 1, wherein the processing structure also is configured to process output from non-brake related sensors.

9. A system according to claim 8, wherein the non-brake related sensors detect at least one of cargo temperature, refrigerator operational status, trailer door open/closed status, and trailer identity.

10. A system according to claim 1, wherein the magnet is a diametrically polarized magnet.

11. A vehicle brake monitoring apparatus comprising:
a magnet mounted on an end of a brake camshaft, the brake camshaft being rotatable during vehicle braking and causing the magnet to rotate;
a non-contact magnetic sensor in axial alignment with and spaced from the end of said brake camshaft, said non-contact magnetic sensor being moveable with a slack adjuster during vehicle braking, said non-contact magnetic sensor being configured to sense continuously relative movement of said magnet and non-contact magnetic sensor during vehicle braking and generate corresponding output indicative of brake stroke length.

12. An apparatus according to claim 11, wherein the non-contact magnetic sensor is fixedly mounted on a bracket that is coupled to said slack adjuster.

13. An apparatus according to claim 12, wherein the bracket is configured to provide protection for said magnet from environmental contaminants.

14. An apparatus according to claim 11, further comprising at least one temperature sensor configured to measure temperature adjacent the vehicle brake.

15. An apparatus according to claim 11, wherein the magnet is a diametrically polarized magnet.

16. A method of monitoring a vehicle brake, the method comprising the steps of:
during vehicle braking, (i) continuously and remotely sensing, using a first non-contact magnetic sensor axially spaced from and fixed relative to an end of a brake camshaft, rotation of a magnet mounted on the end of said brake camshaft during rotation of the brake camshaft and in response generating corresponding output and (ii) continuously and remotely sensing, using a second non-contact magnetic sensor moveable with a slack adjuster, relative movement of the second non-contact magnetic sensor and the magnet during rotation of the brake camshaft and pivoting of the slack adjuster and generating corresponding output;
communicating the sensor output to processing structure; and
comparing, by the processing structure, the sensor output to previous sensor output to determine brake wear and brake stroke length.

17. A method according to claim 16, further comprising the steps of:
sensing temperature adjacent the brake; and
communicating the temperature to the processing structure.

18. A method according to claim 16 further comprising the step of:
displaying information representative of the determined brake wear and brake stroke length.

19. A method according to claim 17, further comprising the step of:
displaying information representative of the determined brake wear and brake stroke length, and the sensed brake temperature.

20. A method according to claim 16 further comprising the steps of:
sensing identity of a connected trailer;
communicating the identity with a time of identification to the processing structure; and
using the identity and the time for fleet accounting purposes.

21. A method according to claim 16, further comprising the step of:
sensing output of non-brake related sensors.

22. A method according to claim 21, wherein the non-brake related sensors detect at least one of cargo temperature, refrigerator operational status, trailer door open/closed status, and trailer identity.

23. A vehicle brake comprising:
an activator responsive to actuation of a vehicle brake pedal during vehicle braking;
a push rod coupled to said activator, said push rod being extended linearly by said actuator during vehicle braking;
a slack adjustor coupled to said push rod adjacent one end thereof and to a brake camshaft adjacent an opposite end thereof, the slack adjuster acting as a lever to impart rotation of said brake camshaft in response to linear movement of said push rod;
a magnet mounted adjacent an end of said brake camshaft adjacent said slack adjuster;
a first non-contact magnetic sensor axially spaced from the end of said brake camshaft and fixed in position relative to said brake camshaft, said first non-contact magnetic sensor configured to sense continuously rotation of said magnet during vehicle braking and generate corresponding output indicative of brake wear; and
a second non-contact magnetic sensor axially spaced from the end of said brake camshaft and moveable with said slack adjuster during vehicle braking, said second non-contact magnetic sensor configured to sense continuously relative movement of said magnet and second non-contact magnetic sensor during vehicle braking and generate corresponding output indicative of brake stroke length.

24. A vehicle brake according to claim 23, wherein the second non-contact magnetic sensor is fixedly mounted on a bracket affixed to said slack adjuster.

25. A system vehicle brake according to claim 24, wherein the bracket is configured to provide protection for said magnet from environmental contaminants.

26. A vehicle brake according to claim 23, wherein the a first non-contact magnetic sensor is fixedly mounted on a stationary component of the vehicle brake.

27. A vehicle brake according to claim 26, wherein the first non-contact magnetic sensor is fixedly mounted on one of an activator mount and a brake camshaft housing.

28. A vehicle brake according to claim 26, wherein the first non-contact magnetic sensor is fixedly mounted on a bracket assembly that is affixed to an activator mount.

29. A vehicle brake according to claim 26, wherein the first non-contact magnetic sensor is fixedly mounted on an assembly that is affixed to a brake camshaft housing.

30. A vehicle brake according to claim 23, further comprising at least one temperature sensor configured to measure temperature adjacent the vehicle brake.

31. A vehicle brake according to claim 23, wherein the magnet is a diametrically polarized magnet.

32. A system for determining vehicle brake status comprising:
a magnet mounted on an end of a brake camshaft, the brake camshaft being rotatable during vehicle braking and causing the magnet to rotate;
a first non-contact magnetic sensor in axial alignment with and spaced from the end of said brake camshaft, said first non-contact magnetic sensor being fixed in position relative to said brake camshaft, said first non-contact magnetic sensor being configured to sense continuously rotation of said magnet during vehicle braking and generate corresponding sensor data;

a second non-contact magnetic sensor in axial alignment with and spaced from the end of said brake camshaft and moveable with a slack adjuster during vehicle braking, said second non-contact magnetic sensor configured to sense continuously relative movement of said magnet and second non-contact magnetic sensor during vehicle braking and generate corresponding sensor data; and processing structure configured to process the sensor data to determine brake wear and brake stroke length.

33. A system according to claim 32, wherein the second non-contact magnetic sensor is fixedly mounted on a bracket affixed to said slack adjuster.

34. A system according to claim 33, wherein the first non-contact magnetic sensor is fixedly mounted on a stationary component of the vehicle brake.

35. A system according to claim 32, further comprising at least one temperature sensor communicating with the processing structure and configured to measure temperature adjacent the vehicle brake.

36. A system according to claim 32, wherein the processing structure is configured to compare sensor data to previous sensor data.

37. A system according to claim 32, further comprising a display screen in communication with the processing structure, the display screen configured to display information indicative of the determined brake wear and brake stroke length.

38. A system according to claim 32, wherein the processing structure is also configured to process output from non-brake related sensors.

39. A system according to claim 38, wherein the non-brake related sensors detect at least one of cargo temperature, refrigerator operational status, trailer door open/closed status, and trailer identity.

40. A system according to claim 32, wherein the magnet is a diametrically polarized magnet.

* * * * *